US012644581B2

(12) United States Patent
Rodgers et al.

(10) Patent No.: US 12,644,581 B2
(45) Date of Patent: Jun. 2, 2026

(54) LIGHTING DEVICES, LIGHT DISTRIBUTION-MODIFYING ELEMENTS, AND METHODS

(71) Applicant: Korrus, Inc., Los Angeles, CA (US)

(72) Inventors: Elizabeth Rodgers, Long Beach, CA (US); Yaote Huang, Los Angeles, CA (US); Robert Fletcher, Pasadena, CA (US); Junxian Ma, El Monte, CA (US)

(73) Assignee: Korrus, Inc., Los Angeles, CA (US)

(*) Notice: Subject to any disclaimer, the term of this patent is extended or adjusted under 35 U.S.C. 154(b) by 0 days.

(21) Appl. No.: 18/345,502

(22) Filed: Jun. 30, 2023

(65) Prior Publication Data

US 2025/0003575 A1 Jan. 2, 2025

(51) Int. Cl.
*F21V 13/00* (2006.01)
*F21S 2/00* (2016.01)
(Continued)

(52) U.S. Cl.
CPC .............. *F21V 13/06* (2013.01); *F21S 2/005* (2013.01); *F21V 7/0083* (2013.01); *F21V 7/043* (2013.01);
(Continued)

(58) Field of Classification Search
CPC ........ F21V 13/06; F21V 7/0083; F21V 7/043; F21V 7/06; F21V 7/09; F21S 2/005
See application file for complete search history.

(56) References Cited

U.S. PATENT DOCUMENTS 7,959,326 B2 * 6/2011 Laporte .................. F21V 14/06 362/249.02
8,092,042 B2 * 1/2012 Wilcox .................... F21V 5/04 362/249.02
(Continued)

FOREIGN PATENT DOCUMENTS

CN 109185736 B * 11/2024 ........... F21V 19/001

OTHER PUBLICATIONS

International Search Report and Written Opinion of the International Searching Authority from a corresponding International patent application (PCT/US24/34249) bearing a mailing date of Jan. 2, 2025.

*Primary Examiner* — Gerald J Sufleta, II
(74) *Attorney, Agent, or Firm* — Brown & Brown IP Law PLLC

(57) ABSTRACT

A lighting device, comprising a housing, a light emitting diode, an optical system configured to at least partially collimate light emissions in a forward direction; and a removable accessory that reflects a portion of the light emissions more than 90 degrees from the forward direction. Also, a lighting device comprising a housing and a plurality of light emitters arranged in a row, and a light distribution-modifying element comprising a body portion and a plurality of light distribution-modifying protrusions (each comprising a reflection surface) arranged in a row substantially parallel to the row of light emitters, at least some of the light emitters aligned with at least some of the plurality of light distribution-modifying protrusions as respective pairs. Also, a light distribution-modifying element, and a lighting device comprising a housing, at least one light emitter, and a light distribution-modifying element comprising a body portion and a light distribution-modifying protrusion. Also, methods.

16 Claims, 10 Drawing Sheets

(51) Int. Cl.

| | |
|---|---|
| ***F21V 7/00*** | (2006.01) |
| ***F21V 7/04*** | (2006.01) |
| ***F21V 7/06*** | (2006.01) |
| ***F21V 7/09*** | (2006.01) |
| ***F21V 13/06*** | (2006.01) |
| *F21Y 103/10* | (2016.01) |
| *F21Y 115/10* | (2016.01) |

(52) U.S. Cl.
CPC .................. *F21V 7/06* (2013.01); *F21V 7/09* (2013.01); *F21Y 2103/10* (2016.08); *F21Y 2115/10* (2016.08)

(56) References Cited

U.S. PATENT DOCUMENTS

| | | | | |
|---|---|---|---|---|
| 8,113,680 | B2 | 2/2012 | O'Brien et al. | |
| 8,678,616 | B2 | 3/2014 | Marquardt et al. | |
| 9,052,081 | B1 | 6/2015 | Paulsel | |
| 9,651,216 | B2 | 5/2017 | Rodgers et al. | |
| 9,651,227 | B2 | 5/2017 | Pickard et al. | |
| 2003/0235050 | A1 * | 12/2003 | West | G02B 19/0028 257/E33.059 |
| 2005/0111220 | A1 | 5/2005 | Smith | |
| 2006/0139659 | A1 | 6/2006 | Steinberg | |
| 2009/0129093 | A1 | 5/2009 | Wittig | |
| 2009/0262532 | A1 * | 10/2009 | Wilcox | F21V 31/005 362/248 |
| 2009/0310356 | A1 * | 12/2009 | Laporte | F21V 7/0091 362/239 |
| 2010/0110671 | A1 * | 5/2010 | Gordin | F21V 5/04 362/228 |
| 2013/0201715 | A1 | 8/2013 | Dau et al. | |
| 2014/0063802 | A1 | 3/2014 | Garcia | |
| 2015/0062909 | A1 | 3/2015 | Progl et al. | |
| 2016/0230964 | A1 * | 8/2016 | Boxler | F21V 17/005 |
| 2017/0307143 | A1 * | 10/2017 | Shah | F21K 9/237 |

* cited by examiner

LIGHTING DEVICES, LIGHT DISTRIBUTION-MODIFYING ELEMENTS, AND METHODS

FIELD OF THE INVENTION

The present invention relates to the field of lighting devices, including lighting devices that include semiconductor light-emitting devices and lenses.

BACKGROUND

Numerous lighting devices, e.g., those that include semiconductor light-emitting devices and lenses, have been developed. As examples, some of such lighting systems include lenses for controlling propagation of light emitted by semiconductor light-emitting devices. Despite the existence of these lighting systems, further improvements are still needed in lighting devices.

SUMMARY OF THE INVENTION

This section (i.e., "Brief Summary of the Invention") presents a simplified summary of the present invention in order to provide a basic understanding of some aspects of the invention. Included in this section are some concepts of the invention as a prelude to more detailed descriptions of aspects of the present invention, and representative embodiments in accordance with aspects of the present invention.

A desirable configuration for an accent linear "graze" fixture is one designed to be mounted in a cove feature to provide as uniform a ceiling illumination as possible. A traditional grazing fixture is required be placed very close the grazing surface (traditionally a wall) to achieve an acceptable aesthetic result. Due to the requirement that the ceiling graze fixture be mounted 6 inches to 18 inches away from the ceiling, a desirable optical distribution looks like a graze at its aiming angle but has more "fill" at shallower angles to make the light intensity more even between the aiming point on the ceiling and the fixture itself.

Despite lighting devices in the past having been constructed based on simulations that would render ideal optical distributions (e.g., favorable max:min ratios on the ceiling), the present inventors observed "dark corners," i.e., essentially areas directly above the fixtures that were appearing darker than the ceiling itself (which is an undesirable aesthetic effect), and there was no easy way to modify or improve optical distribution upon an undesirable effect being observed.

In one aspect of the present invention, light distribution-modifying elements are provided that provide favorable effects.

The present invention also provides lighting devices in which individualized protrusions are provided for each LED position.

In other aspects of the present invention, plural LEDs (e.g., eight LEDs) shine through a like number of TIR lenses into a lens profile that has individualized features for each LED, with an aluminum housing covering the areas of lenses (e.g., a tertiary lens) that are not optically active. (There are "portholes" in the housing through which each of the protrusions from the front of the tertiary lens stick out.) This feature is effective in decreasing "crosstalk" through the lenses to a surprising extent. For example, in devices in which a unitary tertiary lens is provided, stray light from one LED position can sometimes leak into a different portion of the tertiary lens and cause streaks of light (striations) visible in the near field that lighting designers find objectionable. By blocking the areas of the tertiary lens that are not intended to be optically active, those striations are minimized.

In some aspects of the present invention, light that is initially headed in an undesirable direction (e.g., "wasted light") is re-directed to where it is useful light, i.e., into an area directly above the lighting device, and in some cases even behind the lighting device.

In some aspects of the present invention, there is provided a light distribution-modifying element (which can be referred to as an accessory) that is removably engaged with the housing. In situations where such lighting devices are installed, if the actual installation or construction (e.g., of the cove) deviates substantially from the design specifications (for instance, if the cove is unpainted and is therefore much less reflective than if it were painted white), the light distribution-modifying element can be added (or removed) to alter the distribution in a way that compensates for the less-than-ideal cove construction and in some cases evens out the light distribution.

In simulations, altering the light distribution in accordance with the present invention shows as making the optical distribution "worse"-increasing the max:min ratios, for instance. In practice, however, and surprisingly so in view of the simulations, the light distribution altering provided by the present invention provides favorable effects. Moreover, given that there is often no way to know how construction will be carried out (e.g., how a cove will be constructed) prior to the lighting devices showing up on a job site, having a field-installable light distribution-modifying element that can readily alter the light distribution provides a great deal of flexibility that was not previously available.

In accordance with a first aspect of the present invention, there is provided a lighting device, comprising:

- a housing;
- at least one light emitting diode attached to the housing;
- at least one optical system configured to at least partially collimate light emissions in a forward direction; and
- an accessory that is removably engaged with the housing and that reflects a portion of the light emissions more than 90 degrees.

In some embodiments in accordance with the first aspect of the present invention, which can include or not include, as suitable, any of the other features described herein, the at least one light emitting diode comprises a plurality of light emitting diodes arranged in a light emitter row.

In some embodiments in accordance with the first aspect of the present invention, which can include or not include, as suitable, any of the other features described herein:

- the accessory comprises a body portion and a plurality of light distribution-modifying protrusions,
- each of the light distribution-modifying protrusions extends away from the body portion from a body portion end to a remote end,
- the light distribution-modifying protrusions are arranged in a protrusion row, and
- the protrusion row is substantially parallel to the light emitter row.

In some of such embodiments:

- the at least one light emitting diode comprises a plurality of light emitting diodes arranged in a light emitter row, and
- at least some of the plurality of light emitters are aligned with at least some of the plurality of light distribution-modifying protrusions as respective pairs, each aligned pair comprising one of the plurality of light emitters and one of the plurality of light distribution-modifying protrusions, arranged and oriented relative to one another such that for each aligned pair, at least some imaginary lines that extend (1) parallel to an axis of light emission of the light emitter, and (2) through a light emission surface of the light emitter, intersect with the light distribution-modifying protrusion.

In some embodiments in accordance with the first aspect of the present invention, which can include or not include, as suitable, any of the other features described herein:

the lighting device further comprises:

at least first and second electrical current connectors; and at least two current carriers, comprising at least a first line current carrier and at least a first neutral current carrier, and the first line current carrier and the first neutral current carrier are configured to provide respective current paths between the first and second electrical current connectors, and to provide current to at least one of the light emitters.

In some embodiments in accordance with the first aspect of the present invention, which can include or not include, as suitable, any of the other features described herein, each of the plurality of light distribution-modifying protrusions has a substantially similar shape.

In accordance with a second aspect of the present invention, there is provided a lighting device, comprising:

a housing, a plurality of light emitters arranged in a light emitter row, and a light distribution-modifying element, the plurality of light emitters attached to the housing, each of the plurality of light emitters having a respective axis of light emission, the light distribution-modifying element attached to or removably engaged with the housing, the light distribution-modifying element comprising a body portion and a plurality of light distribution-modifying protrusions, each of the light distribution-modifying protrusions extending away from the body portion from a body portion end to a remote end, the light distribution-modifying protrusions arranged in a protrusion row, the protrusion row substantially parallel to the light emitter row, each light distribution-modifying protrusion comprising at least one reflection surface, at least some of the plurality of light emitters are aligned with at least some of the plurality of light distribution-modifying protrusions as respective pairs, each aligned pair comprising one of the plurality of light emitters and one of the plurality of light distribution-modifying protrusions, arranged and oriented relative to one another such that for each aligned pair, at least some imaginary lines that extend (1) parallel to an axis of light emission of the light emitter, and (2) through a light emission surface of the light emitter, intersect with the light distribution-modifying protrusion.

In some embodiments in accordance with the second aspect of the present invention, which can include or not include, as suitable, any of the other features described herein:

the presence of the light distribution-modifying element causes a greater percentage of light emitted by the plurality of light emitters to travel from a second side of a light distribution imaginary plane to a first side of the light distribution imaginary plane than if the light distribution-modifying element were not present, the light distribution imaginary plane (1) encompassing an axis of emission of at least one of the plurality of light emitters and (2) extending through each of the light distribution-modifying protrusions, the first side of the light distribution imaginary plane and the second side of the light distribution imaginary plane on opposite sides of the light distribution imaginary plane.

In some embodiments in accordance with the second aspect of the present invention, which can include or not include, as suitable, any of the other features described herein:

for each reflection surface, a greater percentage of an area of the reflection surface is to a second side of a light distribution imaginary plane than to a first side of the light distribution imaginary plane, the light distribution imaginary plane (1) encompassing an axis of emission of at least one of the plurality of light emitters and (2) extending through each of the light distribution-modifying protrusions.

In some embodiments in accordance with the second aspect of the present invention, which can include or not include, as suitable, any of the other features described herein, for each aligned pair comprising one light emitter and one light distribution-modifying protrusion:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

respective total curvatures of the light distribution-modifying protrusion decrease progressively.

In some of such embodiments:

in a sequence of respective cross-sections of the protrusion in a sequence of first through twenty-first imaginary planes that are each perpendicular to an axis of emission of the light emitter and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

respective total curvatures of the light distribution-modifying protrusion decrease progressively.

In some embodiments in accordance with the second aspect of the present invention, which can include or not include, as suitable, any of the other features described herein, for each of the light distribution-modifying protrusions that is in an aligned pair:

in a cross-section of the protrusion in the first of the sequence of planes, the reflection surface has a total curvature in a range of from 200 degrees to 280 degrees;

in a cross-section of the protrusion in the second of the sequence of planes, the reflection surface has a total curvature in a range of from 130 degrees to 210 degrees;

in a cross-section of the protrusion in the third of the sequence of planes, the reflection surface has a total curvature in a range of from 100 degrees to 180 degrees;

in a cross-section of the protrusion in the fourth of the sequence of planes, the reflection surface has a total curvature in a range of from 80 degrees to 160 degrees; and in a cross-section of the protrusion in the fifth of the sequence of planes, the reflection surface has a total curvature in a range of from 0 degrees to 160 degrees.

In some embodiments in accordance with the second aspect of the present invention, which can include or not include, as suitable, any of the other features described herein, for each aligned pair of one light emitter and one light distribution-modifying protrusion:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

a length of the reflection surface decreases progressively.

In some of such embodiments:

in a sequence of respective cross-sections of the protrusion in a sequence of first through twenty-first imaginary planes that are each perpendicular to an axis of emission of the light emitter and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

a length of the reflection surface decreases progressively, and/or in some of such embodiments, for each aligned pair of one light emitter and one light distribution-modifying protrusion, in said sequence of cross-sections:

a curvature of the reflection surface remains substantially constant.

In some embodiments in accordance with the second aspect of the present invention, which can include or not include, as suitable, any of the other features described herein, for each aligned pair of one light emitter and one light distribution-modifying protrusion:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

the reflection surface is substantially circular in at least one of the sequence of cross-sections (and in some embodiments, the reflection surface is substantially circular in at least two of the sequence of cross-sections, at least three of the sequence of cross-sections, or in all of the sequence of cross-sections).

In some of such embodiments:

in a sequence of respective cross-sections of the protrusion in a sequence of first through twenty-first imaginary planes that are each perpendicular to an axis of emission of the light emitter and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

the reflection surface is substantially circular in at least one of the sequence of cross-sections (and in some embodiments, the reflection surface is substantially circular in at least two of the sequence of cross-sections, at least three of the sequence of cross-sections, or in all of the sequence of cross-sections.

In some embodiments in accordance with the second aspect of the present invention, which can include or not include, as suitable, any of the other features described herein, for each aligned pair of one light emitter and one light distribution-modifying protrusion:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

the reflection surface is substantially parabolic in at least one of the sequence of cross-sections (and in some embodiments, the reflection surface is substantially parabolic in at least two of the sequence of cross-sections, at least three of the sequence of cross-sections, or in all of the sequence of cross-sections).

In some of such embodiments:

in a sequence of respective cross-sections of the protrusion in a sequence of first through twenty-first imaginary planes that are each perpendicular to an axis of emission of the light emitter and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

the reflection surface is substantially parabolic in at least one of the sequence of cross-sections (and in some embodiments, the reflection surface is substantially parabolic in at least two of the sequence of cross-sections, at least three of the sequence of cross-sections, or in all of the sequence of cross-sections).

In some embodiments in accordance with the second aspect of the present invention, which can include or not include, as suitable, any of the other features described herein, for each aligned pair of one light emitter and one light distribution-modifying protrusion:

in a cross-section in a plane that includes the axis of emission of the light emitter and is perpendicular to a light distribution imaginary plane, the light distribution imaginary plane (1) encompassing an axis of emission of at least one of the plurality of light emitters and (2) extending through each of the light distribution-modifying protrusions:

angles of incidence, relative to the reflection surface of the light distribution-modifying protrusion, of imaginary lines parallel to the axis of emission of the light emitter, are greater at greater distances from the light emitter.

In some embodiments in accordance with the second aspect of the present invention, which can include or not include, as suitable, any of the other features described herein, for each aligned pair of one light emitter and one light distribution-modifying protrusion:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

a distance between the reflection surface and a lower imaginary plane progressively increases, the lower imaginary plane is parallel to a light distribution imaginary plane and to a second side of the light distribution imaginary plane, and the light distribution imaginary plane (1) encompassing an axis of emission of at least one of the plurality of light emitters and (2) extending through each of the light distribution-modifying protrusions, the first side of the light distribution imaginary plane and the second side of the light distribution imaginary plane on opposite sides of the light distribution imaginary plane.

In some of such embodiments:

in a sequence of respective cross-sections of the protrusion in a sequence of first through twenty-first imaginary planes that are each perpendicular to an axis of emission of the light emitter and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

a distance between the reflection surface and a lower imaginary plane progressively increases, the lower imaginary plane is parallel to a light distribution imaginary plane and to a second side of the light distribution imaginary plane, and the light distribution imaginary plane (1) encompassing an axis of emission of at least one of the plurality of light emitters and (2) extending through each of the light distribution-modifying protrusions, the first side of the light distribution imaginary plane and the second side of the light distribution imaginary plane on opposite sides of the light distribution imaginary plane.

In some embodiments in accordance with the second aspect of the present invention, which can include or not include, as suitable, any of the other features described herein, for each aligned pair of one light emitter and one light distribution-modifying protrusion:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

the reflector surface is substantially concave.

In some of such embodiments:

in a sequence of respective cross-sections of the protrusion in a sequence of first through twenty-first imaginary planes that are each perpendicular to an axis of emission of the light emitter and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

the reflector surface is substantially concave.

In some embodiments in accordance with the second aspect of the present invention, which can include or not include, as suitable, any of the other features described herein, the light distribution-modifying element is attached to or removably engaged with the housing.

In some embodiments in accordance with the second aspect of the present invention, which can include or not include, as suitable, any of the other features described herein:

the lighting device further comprises:

at least first and second electrical current connectors; and at least two current carriers, comprising at least a first line current carrier and at least a first neutral current carrier, and the first line current carrier and the first neutral current carrier are configured to provide respective current paths between the first and second electrical current connectors, and to provide current to at least one of the light emitters.

In some embodiments in accordance with the second aspect of the present invention, which can include or not include, as suitable, any of the other features described herein, each of the plurality of light distribution-modifying protrusions has a substantially similar shape.

In some embodiments in accordance with the second aspect of the present invention, which can include or not include, as suitable, any of the other features described herein, each light emitter comprises at least one light-emitting diode in direct contact or indirect contact with at least one lens.

In some embodiments in accordance with the second aspect of the present invention, which can include or not include, as suitable, any of the other features described herein:

the plurality of light emitters comprises a number of light emitters that is equal to a number of light distribution-modifying protrusions in the plurality of light distribution-modifying protrusions, each light emitter is in an aligned pair with a light distribution-modifying protrusion, and each light distribution-modifying protrusion is in an aligned pair with a light emitter.

In accordance with a third aspect of the present invention, there is provided a light distribution-modifying element, comprising:

a body portion, and a plurality of light distribution-modifying protrusions arranged in a protrusion row, each of the light distribution-modifying protrusions extending away from the body portion from a body portion end to a remote end, each light distribution-modifying protrusion comprising at least one reflection surface, and the light distribution-modifying protrusions arranged such that each of a series of lines that are parallel to one another and that each extend in a first plane passes through a respective one of the light distribution-modifying protrusions.

Any of the light distribution-modifying elements as described herein can be used in the lighting devices in accordance with the third aspect of the present invention, and any of the features of the light distribution-modifying elements described herein with respect to the third aspect of the present invention can be embodied in the light distribution-modifying elements in the lighting devices in accordance with the first and second aspects of the present invention.

In some embodiments in accordance with the third aspect of the present invention, which can include or not include, as suitable, any of the other features described herein, for each of the plurality of light distribution-modifying protrusions:

in a sequence of respective cross-sections of the protrusion in a sequence of first through fifth imaginary planes that are each perpendicular to said series of lines that are parallel to one another and that each extend in a first plane and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

respective total curvatures of the light distribution protrusion decrease progressively.

In some of such embodiments:

in a sequence of respective cross-sections of the protrusion in a sequence of first through twenty-first imaginary planes that are each perpendicular to said series of lines that are parallel to one another and that each extend in a first plane and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

respective total curvatures of the light distribution protrusion decrease progressively;

In some embodiments in accordance with the third aspect of the present invention, which can include or not include, as suitable, any of the other features described herein, for each of the plurality of light distribution-modifying protrusions:

in a sequence of respective cross-sections of the protrusion in a sequence of first through fifth imaginary planes that are each perpendicular to said series of lines that are parallel to one another and that each extend in a first plane and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

in a cross-section of the protrusion in the first of the sequence of planes, the reflection surface has a total curvature in a range of from 200 degrees to 280 degrees;

in a cross-section of the protrusion in the second of the sequence of planes, the reflection surface has a total curvature in a range of from 130 degrees to 210 degrees;

in a cross-section of the protrusion in the third of the sequence of planes, the reflection surface has a total curvature in a range of from 100 degrees to 180 degrees;

in a cross-section of the protrusion in the fourth of the sequence of planes, the reflection surface has a total curvature in a range of from 80 degrees to 160 degrees; and in a cross-section of the protrusion in the fifth of the sequence of planes, the reflection surface has a total curvature in a range of from 0 degrees to 160 degrees.

In some embodiments in accordance with the third aspect of the present invention, which can include or not include, as suitable, any of the other features described herein, for each of the plurality of light distribution-modifying protrusions:

in a sequence of respective cross-sections of the protrusion in a sequence of first through twenty-first imaginary planes that are each perpendicular to said series of lines that are parallel to one another and that each extend in a first plane and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

in a cross-section of the protrusion in the first of the sequence of planes, the reflection surface has a total curvature in a range of from 200 degrees to 280 degrees;

in a cross-section of the protrusion in the fifth of the sequence of planes, the reflection surface has a total curvature in a range of from 130 degrees to 210 degrees;

in a cross-section of the protrusion in the tenth of the sequence of planes, the reflection surface has a total curvature in a range of from 100 degrees to 180 degrees;

in a cross-section of the protrusion in the fifteenth of the sequence of planes, the reflection surface has a total curvature in a range of from 80 degrees to 160 degrees;

in a cross-section of the protrusion in the eighteenth of the sequence of planes, the reflection surface has a total curvature in a range of from 60 degrees to 140 degrees; and in a cross-section of the protrusion in the twenty-first of the sequence of planes, the reflection surface has a total curvature in a range of from 0 degrees to 140 degrees.

In some embodiments in accordance with the third aspect of the present invention, which can include or not include, as suitable, any of the other features described herein, for each of the plurality of light distribution-modifying protrusions:

in a sequence of respective cross-sections of the protrusion in a sequence of first through fifth imaginary planes that are each perpendicular to said series of lines that are parallel to one another and that each extend in a first plane and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

a length of the reflection surface decreases progressively.

In some of such embodiments:

in a sequence of respective cross-sections of the protrusion in a sequence of first through twenty-first imaginary planes that are each perpendicular to said series of lines that are parallel to one another and that each extend in a first plane and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

a length of the reflection surface decreases progressively, and/or for each of the plurality of light distribution-modifying protrusions:

in said sequence of cross-sections of the protrusion in a sequence of first through twenty-first imaginary planes, a curvature of the reflection surface remains substantially constant.

In some embodiments in accordance with the third aspect of the present invention, which can include or not include, as suitable, any of the other features described herein, for each of the plurality of light distribution-modifying protrusions:

in a sequence of respective cross-sections of the protrusion in a sequence of first through fifth imaginary planes that are each perpendicular to said series of lines that are parallel to one another and that each extend in a first plane and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

the reflection surface is substantially circular in at least one of the sequence of cross-sections (and in some embodiments, the reflection surface is substantially circular in at least two of the sequence of cross-sections, at least three of the sequence of cross-sections, or in all of the sequence of cross-sections).

In some of such embodiments:

in a sequence of respective cross-sections of the protrusion in a sequence of first through twenty-first imaginary planes that are each perpendicular to said series of lines that are parallel to one another and that each extend in a first plane and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

the reflection surface is substantially circular in at least one of the sequence of cross-sections (and in some embodiments, the reflection surface is substantially circular in at least two of the sequence of cross-sections, at least three of the sequence of cross-sections, or in all of the sequence of cross-sections), and/or each of said series of lines that are parallel to one another and that each extend in a first plane extends through a center of the respective circular reflection surface.

In some embodiments in accordance with the third aspect of the present invention, which can include or not include, as suitable, any of the other features described herein, for each of the plurality of light distribution-modifying protrusions:

in a sequence of respective cross-sections of the protrusion in a sequence of first through fifth imaginary planes that are each perpendicular to said series of lines that are parallel to one another and that each extend in a first plane and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

the reflection surface is substantially parabolic in at least one of the sequence of cross-sections (and in some embodiments, the reflection surface is substantially parabolic in at least two of the sequence of cross-sections, at least three of the sequence of cross-sections, or in all of the sequence of cross-sections).

In some of such embodiments:

in a sequence of respective cross-sections of the protrusion in a sequence of first through twenty-first imaginary planes that are each perpendicular to said series of lines that are parallel to one another and that each extend in a first plane and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

the reflection surface is substantially parabolic in at least one of the sequence of cross-sections (and in some embodiments, the reflection surface is substantially parabolic in at least two of the sequence of cross-sections, at least three of the sequence of cross-sections, or in all of the sequence of cross-sections).

In some embodiments in accordance with the third aspect of the present invention, which can include or not include, as suitable, any of the other features described herein, each light distribution-modifying protrusion extends away from a first side of the light distribution-modifying element, and for each light distribution-modifying protrusion:

in a cross-section in a plane that includes the line that passes through the light distribution-modifying protrusion and that is perpendicular to the first plane, angles of incidence, relative to the reflection surface of the light distribution-modifying protrusion, of imaginary lines parallel to said line that passes through the light distribution-modifying protrusion, are greater at greater distances from the first side of the light distribution-modifying element.

In some embodiments in accordance with the third aspect of the present invention, which can include or not include, as suitable, any of the other features described herein, for each of the plurality of light distribution-modifying protrusions:

in a sequence of respective cross-sections of the protrusion in a sequence of first through fifth imaginary planes that are each perpendicular to said series of lines that are parallel to one another and that each extend in a first plane and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

a distance between the reflection surface and a lower imaginary plane progressively increases, the lower imaginary plane is parallel to a light distribution imaginary plane and to a second side of the light distribution imaginary plane, and the light distribution imaginary plane (1) encompassing said series of lines that are parallel to one another and that each extend in a first plane and (2) extending through each of the light distribution-modifying protrusions, the first side of the light distribution imaginary plane and the second side of the light distribution imaginary plane on opposite sides of the light distribution imaginary plane.

In some of such embodiments:

in a sequence of respective cross-sections of the protrusion in a sequence of first through twenty-first imaginary planes that are each perpendicular to said series of lines that are parallel to one another and that each extend in a first plane and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

a distance between the reflection surface and a lower imaginary plane progressively increases, the lower imaginary plane is parallel to a light distribution imaginary plane and to a second side of the light distribution imaginary plane, and the light distribution imaginary plane (1) encompassing said series of lines that are parallel to one another and that each extend in a first plane and (2) extending through each of the light distribution-modifying protrusions, the first side of the light distribution imaginary plane and the second side of the light distribution imaginary plane on opposite sides of the light distribution imaginary plane.

In some embodiments in accordance with the third aspect of the present invention, which can include or not include, as suitable, any of the other features described herein, for each aligned pair of one light emitter and one light distribution-modifying protrusion:

in a sequence of respective cross-sections of the protrusion in a sequence of first through fifth imaginary planes that are each perpendicular to said series of lines that are parallel to one another and that each extend in a first plane and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

the reflector surface is substantially concave.

In some of such embodiments:

in a sequence of respective cross-sections of the protrusion in a sequence of first through twenty-first imaginary planes that are each perpendicular to said series of lines that are parallel to one another and that each extend in a first plane and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

the reflector surface is substantially concave.

In some embodiments in accordance with the third aspect of the present invention, which can include or not include, as suitable, any of the other features described herein, each of the plurality of light distribution-modifying protrusions has a substantially similar shape.

In some embodiments in accordance with the third aspect of the present invention, which can include or not include, as suitable, any of the other features described herein, the light distribution-modifying device is capable of being positioned in relation to a housing to which a plurality of light emitters are attached and arranged in a row, with the respective axes of emission of each of the plurality of light emitters substantially parallel to a first imaginary emission line, such that:

at least some of the plurality of light emitters are aligned with at least some of the plurality of light distribution-modifying protrusions as respective pairs, each aligned pair comprising one of the plurality of light emitters and one of the plurality of light distribution-modifying protrusions, arranged and oriented relative to one another such that for each aligned pair, at least some imaginary lines that extend (1) parallel to an axis of light emission of the light emitter, and (2) through a light emission surface of the light emitter, intersect with the light distribution-modifying protrusion, and the presence of the light distribution-modifying element would cause a greater percentage of light emitted by the plurality of light emitters to travel from a second side of a light distribution imaginary plane to a first side of the light distribution imaginary plane than if the light distribution-modifying element were not present, the light distribution imaginary plane (1) encompassing an axis of emission of at least one of the plurality of light emitters and (2) extending through each of the light distribution-modifying protrusions, the first side of the light distribution imaginary plane and the second side of the light distribution imaginary plane on opposite sides of the light distribution imaginary plane.

In some embodiments in accordance with the third aspect of the present invention, which can include or not include, as suitable, any of the other features described herein, the light distribution-modifying device is capable of being positioned in relation to a housing to which a plurality of light emitters are attached and arranged in a row, with the respective axes of emission of each of the plurality of light emitters substantially parallel to a first imaginary emission line, such that:

at least some of the plurality of light emitters are aligned with at least some of the plurality of light distribution-modifying protrusions as respective pairs, each aligned pair comprising one of the plurality of light emitters and one of the plurality of light distribution-modifying protrusions, arranged and oriented relative to one another such that for each aligned pair, at least some imaginary lines that extend (1) parallel to an axis of light emission of the light emitter, and (2) through a light emission surface of the light emitter, intersect with the light distribution-modifying protrusion, for each reflection surface, a greater percentage of an area of the reflection surface is to a second side of a light distribution imaginary plane than to a first side of the light distribution imaginary plane, and the light distribution imaginary plane (1) encompasses an axis of emission of one of the plurality of light emitters and (2) extends through each of the light distribution-modifying protrusions.

In accordance with a fourth aspect of the present invention, there is provided a lighting device, comprising:

a housing, at least one light emitter, and a light distribution-modifying element, the light emitter attached to the housing, the light emitter having an axis of light emission, the light distribution-modifying element attached to or removably engaged with the housing, the light distribution-modifying element comprising a body portion and a light distribution-modifying protrusion, the light distribution-modifying protrusion extending away from the body portion from a body portion end to a remote end, the light distribution-modifying protrusion comprising at least one reflection surface, and the light emitter aligned with the light distribution-modifying protrusion, at least some imaginary lines that extend (1) parallel to an axis of light emission of the light emitter, and (2) through a light emission surface of the light emitter, intersect with the light distribution-modifying protrusion.

In some embodiments in accordance with the fourth aspect of the present invention, which can include or not include, as suitable, any of the other features described herein:

the presence of the light distribution-modifying element causes a greater percentage of light emitted by the light emitter to travel from a second side of a light distribution imaginary plane to a first side of the light distribution imaginary plane than if the light distribution-modifying element were not present, the light distribution imaginary plane (1) encompassing an axis of emission of the light emitter and (2) extending through the light distribution-modifying protrusion, the first side of the light distribution imaginary plane and the second side of the light distribution imaginary plane on opposite sides of the light distribution imaginary plane.

In some embodiments in accordance with the fourth aspect of the present invention, which can include or not include, as suitable, any of the other features described herein:

a greater percentage of an area of the reflection surface is to a second side of a light distribution imaginary plane than to a first side of the light distribution imaginary plane, the light distribution imaginary plane (1) encompassing an axis of emission of the light emitter and (2) extending through the light distribution-modifying protrusion.

In some embodiments in accordance with the fourth aspect of the present invention, which can include or not include, as suitable, any of the other features described herein:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

respective total curvatures of the light distribution-modifying protrusion decrease progressively.

In some of such embodiments:

in a sequence of respective cross-sections of the protrusion in a sequence of first through twenty-first imaginary planes that are each perpendicular to an axis of emission of the light emitter and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

respective total curvatures of the light distribution-modifying protrusion decrease progressively.

In some embodiments in accordance with the fourth aspect of the present invention, which can include or not include, as suitable, any of the other features described herein:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

in a cross-section of the protrusion in the first of the sequence of planes, the reflection surface has a total curvature in a range of from 200 degrees to 280 degrees;

in a cross-section of the protrusion in the second of the sequence of planes, the reflection surface has a total curvature in a range of from 130 degrees to 210 degrees;

in a cross-section of the protrusion in the third of the sequence of planes, the reflection surface has a total curvature in a range of from 100 degrees to 180 degrees;

in a cross-section of the protrusion in the fourth of the sequence of planes, the reflection surface has a total curvature in a range of from 80 degrees to 160 degrees; and in a cross-section of the protrusion in the fifth of the sequence of planes, the reflection surface has a total curvature in a range of from 0 degrees to 160 degrees.

In some embodiments in accordance with the fourth aspect of the present invention, which can include or not include, as suitable, any of the other features described herein:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

a length of the reflection surface decreases progressively.

In some of such embodiments:

in a sequence of respective cross-sections of the protrusion in a sequence of first through twenty-first imaginary planes that are each perpendicular to an axis of emission of the light emitter and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

a length of the reflection surface decreases progressively, and/or in said sequence of cross-sections of the protrusion in a sequence of first through twenty-first imaginary planes:

a curvature of the reflection surface remains substantially constant.

In some embodiments in accordance with the fourth aspect of the present invention, which can include or not include, as suitable, any of the other features described herein:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

the reflection surface is substantially circular in at least one of the sequence of cross-sections (and in some embodiments, the reflection surface is substantially circular in at least two of the sequence of cross-sections, at least three of the sequence of cross-sections, or in all of the sequence of cross-sections).

In some of such embodiments:

in a sequence of respective cross-sections of the protrusion in a sequence of first through twenty-first imaginary planes that are each perpendicular to an axis of emission of the light emitter and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

the reflection surface is substantially circular in at least one of the sequence of cross-sections (and in some embodiments, the reflection surface is substantially circular in at least two of the sequence of cross-sections, at least three of the sequence of cross-sections, or in all of the sequence of cross-sections).

In some embodiments in accordance with the fourth aspect of the present invention, which can include or not include, as suitable, any of the other features described herein:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

the reflection surface is substantially parabolic in at least one of the sequence of cross-sections (and in some embodiments, the reflection surface is substantially parabolic in at least two of the sequence of cross-sections, at least three of the sequence of cross-sections, or in all of the sequence of cross-sections).

In some of such embodiments:

in a sequence of respective cross-sections of the protrusion in a sequence of first through twenty-first imaginary planes that are each perpendicular to an axis of emission of the light emitter and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

the reflection surface is substantially parabolic in at least one of the sequence of cross-sections (and in some embodiments, the reflection surface is substantially parabolic in at least two of the sequence of cross-sections, at least three of the sequence of cross-sections, or in all of the sequence of cross-sections).

In some embodiments in accordance with the fourth aspect of the present invention, which can include or not include, as suitable, any of the other features described herein:

in a cross-section in a plane that includes the axis of emission of the light emitter and is perpendicular to a light distribution imaginary plane, the light distribution imaginary plane (1) encompassing an axis of emission of at least one of the plurality of light emitters and (2) extending through each of the light distribution-modifying protrusions:

angles of incidence, relative to the reflection surface of the light distribution-modifying protrusion, of imaginary lines parallel to the axis of emission of the light emitter, are greater at greater distances from the light emitter.

In some embodiments in accordance with the fourth aspect of the present invention, which can include or not include, as suitable, any of the other features described herein:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

a distance between the reflection surface and a lower imaginary plane progressively increases, the lower imaginary plane is parallel to a light distribution imaginary plane and to a second side of the light distribution imaginary plane, and the light distribution imaginary plane (1) encompassing an axis of emission of the light emitter and (2) extending through the light distribution-modifying protrusion, the first side of the light distribution imaginary plane and the second side of the light distribution imaginary plane on opposite sides of the light distribution imaginary plane.

In some of such embodiments:

in a sequence of respective cross-sections of the protrusion in a sequence of first through twenty-first imaginary planes that are each perpendicular to an axis of emission of the light emitter and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

a distance between the reflection surface and a lower imaginary plane progressively increases, the lower imaginary plane is parallel to a light distribution imaginary plane and to a second side of the light distribution imaginary plane, and the light distribution imaginary plane (1) encompassing an axis of emission of the light emitter and (2) extending through the light distribution-modifying protrusion, the first side of the light distribution imaginary plane and the second side of the light distribution imaginary plane on opposite sides of the light distribution imaginary plane In some embodiments in accordance with the fourth aspect of the present invention, which can include or not include, as suitable, any of the other features described herein:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

the reflector surface is substantially concave.

In some of such embodiments:

in a sequence of respective cross-sections of the protrusion in a sequence of first through twenty-first imaginary planes that are each perpendicular to an axis of emission of the light emitter and that are spaced in increments from the body portion end of the protrusion, each increment equal to 3.5-6.5 percent of a distance between the body portion end of the protrusion and the remote end of the protrusion, the first imaginary plane extending through the body portion end of the protrusion, the twenty-first imaginary plane farthest from the body portion end of the protrusion and comprising the remote end of the protrusion:

the reflector surface is substantially concave.

In some embodiments in accordance with the fourth aspect of the present invention, which can include or not include, as suitable, any of the other features described herein, the light distribution-modifying element is attached to or removably engaged with the housing.

In accordance with a fifth aspect of the present invention, there is provided a method comprising removably attaching an accessory (a light distribution-modifying element) as described herein to a lighting device comprising a housing and at least one light emitter.

In accordance with a sixth aspect of the present invention, there is provided a method comprising removing a removable accessory (a light distribution-modifying element) as described herein from a lighting device comprising a housing and at least one light emitter.

In accordance with a seventh aspect of the present invention, there is provided a method comprising attaching a light device as disclosed herein to a construction structure, e.g., a wall.

In accordance with an eighth aspect of the present invention, there is provided a method comprising supplying electricity to at least one light emitting diode in a lighting device as described herein.

The invention may be more fully understood with reference to the accompanying drawings and the following detailed description of the invention.

BRIEF DESCRIPTION OF THE DRAWING FIGURES

Figure 11:
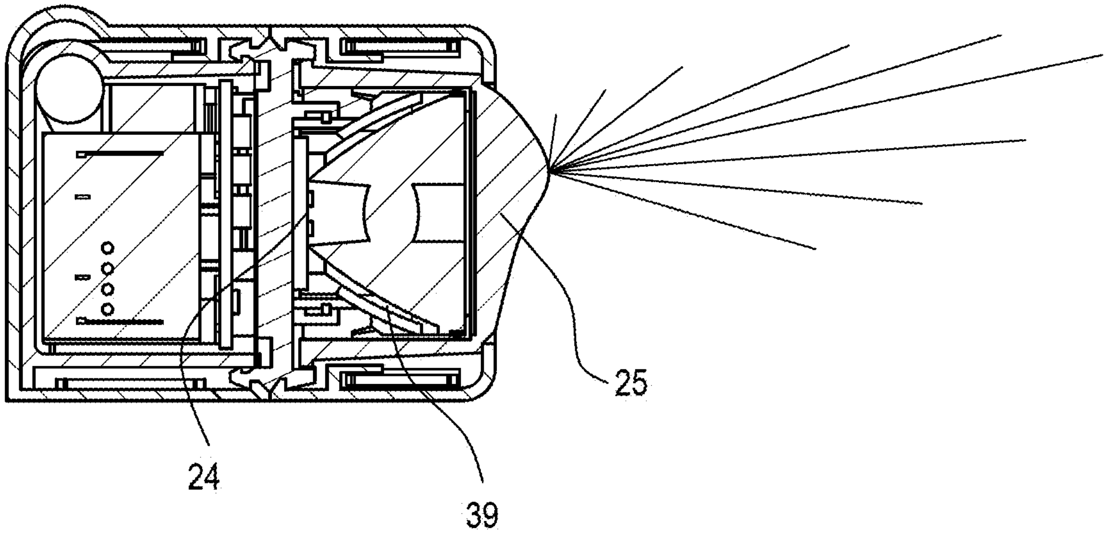

FIG. 11 is a schematic illustration showing an asymmetric light distribution of a lighting device (including a light-emitting device 24, a lens 25 and a reflective cup 39) without a field-installable light distribution-modifying element.

Figure 12:
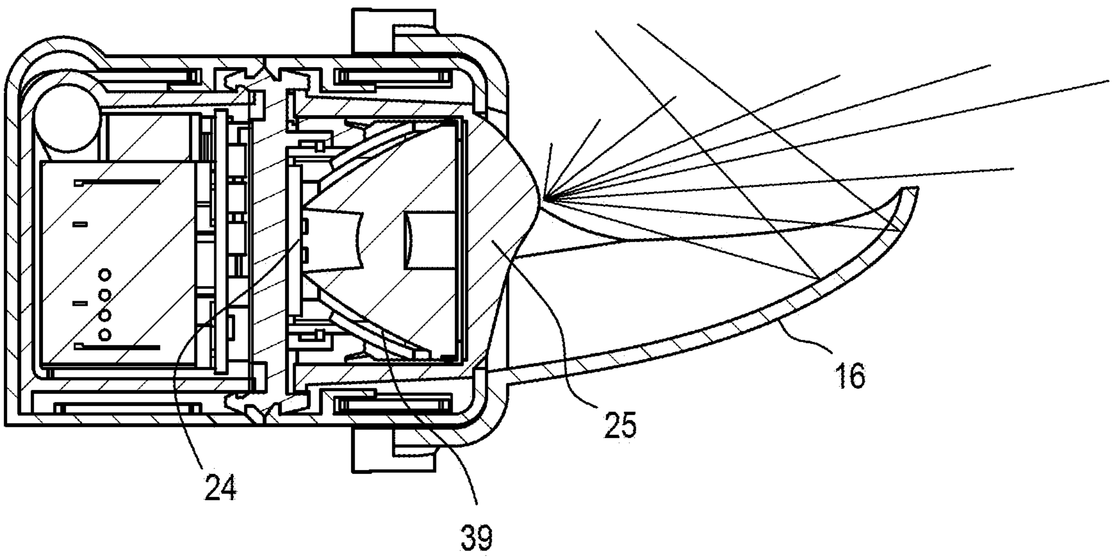
Figure 13:
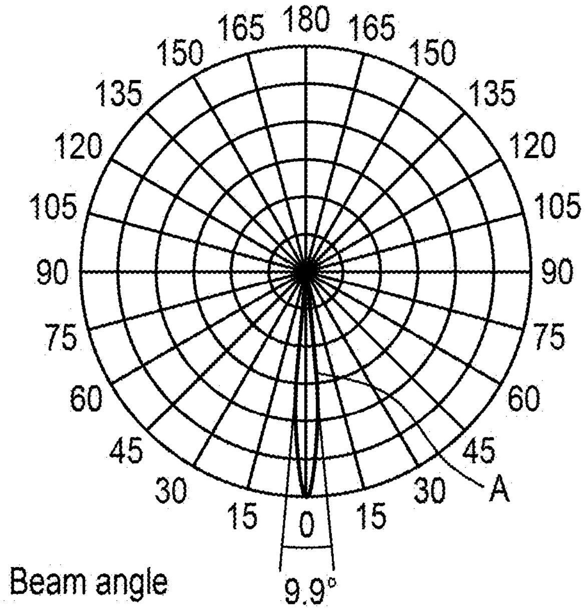
Figure 14:
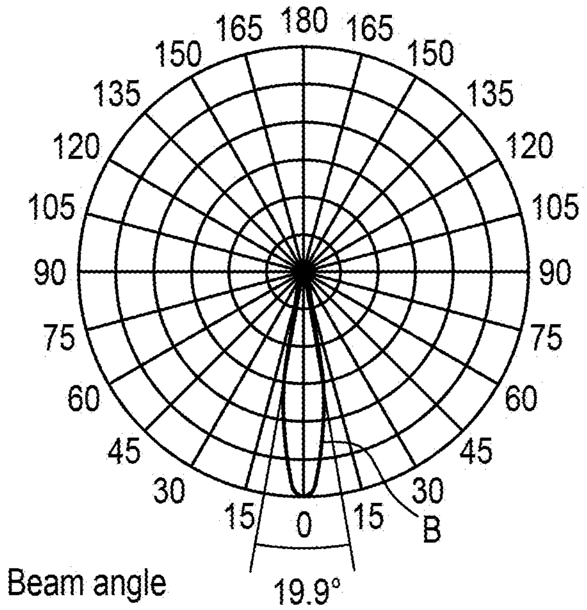

FIG. 12 is a schematic view showing an asymmetric light distribution of a lighting device in accordance with the present invention, including the lighting device of FIG. 11, with a light distribution-modifying element in place.

FIGS. 13-16 show polar distributions of various lighting devices.

FIG. 17 is a schematic illustration to show angular orientations.

DETAILED DESCRIPTION OF THE INVENTION

The expression "invention" is used herein to refer to any portion (or portions) of the inventive subject matter disclosed herein. As described herein, the present invention includes many aspects.

The expression "comprises" or "comprising," as used herein, is used in accordance with its well known usage, and means that the item that "comprises" the recited elements (or that is "comprising" the recited elements) includes at least the recited elements, and can optionally include any additional elements. For example, an item that "comprises a light distribution-modifying element" includes at least one a light distribution-modifying element, i.e., it can include a single light distribution-modifying element or a plurality of light distribution-modifying elements. An item that comprises at least first and second recited elements can include the two recited elements or can include three or more of the recited elements.

The present invention encompasses many combinations of elements and features. The expression "In some embodiments in accordance with the present inventive subject matter, which can include or not include, as suitable, any of the other features described herein," or the like, is used in the present specification to introduce elements and/or features of the present invention that can be included or not included in any particular embodiment, i.e., elements and/or features that are not mutually exclusive can be combined in any suitable way. In other words, the present invention encompasses all combinations of elements and/or features that are introduced with the expression "In some embodiments in accordance with the present inventive subject matter, which can include or not include, as suitable, any of the other features described herein," or the like.

Any statement herein that an item is configured to perform some action means that at least one component (or a combination of two or more components) in the item is configured to perform such action.

Where an expression is defined herein in terms of the meaning of the expression in the singular, the definition applies also to the plural (and vice-versa, i.e., for an expression defined herein in the plural, the definition applies also to the singular). Definitions of one form of an expression apply to the same expression in a different form of the word or words.

A statement herein that "each" of a plurality of items has a feature (e.g., in the expression "each of the plurality of light emitters having a respective axis of light emission" means that each of the respective plurality of items has its own individual feature (e.g., axis of light emission); in general, "each" does not exclude the possibility that the feature for one item is the same as or similar to the feature for another item.

As used herein, the singular forms "a", "an" and "the" are intended to include the plural forms as well, unless the context clearly indicates otherwise.

Relative terms, such as "lower", "bottom", "below", "upper", "top", "above," "horizontal" or "vertical" may be used herein to describe one element's relationship to another element (or to other elements), e.g., as illustrated in the Figures. Such relative terms are intended to encompass different orientations of the device in addition to the orientation depicted in the Figures and/or as described herein. For example, if a device is turned over, elements described as being on the "lower" side of other elements would then be oriented on "upper" sides of the other elements. The exemplary term "lower" can therefore encompass both an orientation of "lower" and "upper," depending on the particular orientation. Similarly, if a device is turned over, elements described as "below" or "beneath" other elements would then be oriented "above" the other elements. The exemplary terms "below" or "beneath" can therefore encompass both an orientation of above and below.

The expression "substantially symmetrical" relative to a plane, as used herein (e.g., in the expression "the lens is substantially symmetrical relative to a lens plane of symmetry"), refers to a shape, and means that the shape is symmetrical or could be made symmetrical by removing a specific region or regions which in total comprise not more than about 5 percent of its volume and/or by adding a specific region or regions which in total comprise not more than about 5 percent of its volume.

The expression "asymmetric" relative to an axis, as used herein (e.g., in the expression "asymmetric relative to an axis of emission of the light emitter"), refers to a shape, and means that the shape is could not be made symmetrical by removing a specific region or regions which in total comprise not more than about 5 percent of its volume and/or by adding a specific region or regions which in total comprise not more than about 5 percent of its volume.

The expression "substantially similar shape" (e.g., in the expression "each of the plurality of lenses has a substantially similar shape" and in the expression "each of the plurality of light distribution-modifying protrusions has a substantially similar shape"), refers to first and second shapes, and means that if a first imaginary shape corresponding to the first shape were superposed with a second imaginary shape corresponding to the second shape, for at least 90 percent of the points on the first imaginary shape, a distance between such point and a nearest point on the second imaginary shape would be within a distance equal to 10 percent of a largest dimension of the first imaginary shape.

The expression "substantially planar," as used herein (e.g., in the expression "substantially planar emission region") means that at least 90 percent of the points in the region characterized as being substantially planar are located on one of or between a pair of planes that are parallel and which are spaced from each other by a distance of not more than 5 percent of the largest dimension of the region. For a surface to be "substantially planar," the surface must be continuous or substantially continuous, i.e., the surface has no holes, or the sum of the areas of any holes does not exceed 5 percent of the area of the surface.

The expression "ray" is used herein geometrically to refer to a part of a line that has one endpoint and is otherwise unbounded (i.e., a half-infinite line or a half-line). The expression "light ray" is used herein to refer to light that travels along a ray.

The expression "direction," as used herein, means along a first ray, or along any other ray extending infinitely parallel to the first ray.

The expression "the housing extends in a first direction" means that the housing occupies points along rays that extend in the first direction, and the distance along the rays that points on the housing occupy can be measured in either direction along the ray.

The expression "arranged in a row", as used herein in the context of a plurality of items being arranged in a row (e.g., in the expression "the plurality of light emitters attached to the housing and arranged in a row" and in the expression "a plurality of light distribution-modifying protrusions arranged in a row"), means that there are at least two of the items, and there is at least one imaginary line that extends through each of the items.

The expression "the protrusion row substantially parallel to the light emitter row," as used herein, means that a first imaginary line that extends through each of the protrusions is substantially parallel to a second imaginary line that extends through each of the light emitters.

The expression "substantially parallel," as used herein in relation to two lines, means that the two lines could be made parallel by tilting one of the lines by 5 degrees or less.

In some aspects of the present invention, protrusions are described herein in terms of the "total curvature" of a cross-section of a reflection surface of the protrusion. Every point along the cross-section of the reflection surface has a corresponding tangent line of a respective angular orientation. Angular orientation can be defined in terms of an origin point and a circle that defines 360 degrees around the circle. For example, referring to FIG. 17, 0 degrees can be defined as flat (in the orientation in FIG. 17), i.e., the angular orientation at the lowermost point of a U-shaped cross-section of a reflection surface; 90 degrees (again referring to FIG. 17) is vertically downward, i.e., the angular orientation at the top left of the U-shaped cross-section of a reflection surface, and 270 degrees is vertically upward, i.e., the angular orientation at the top right of the U-shaped cross-section of a reflection surface. The "total curvature" of a cross-section of a reflection surface of a protrusion is equal to the largest difference between angular orientations of respective tangent lines taken at points along the cross-section of the reflection surface.

The expression "configured to at least partially collimate light emissions in a forward direction," as used herein, means to increase the percentage of light rays that are substantially parallel to the forward direction. For example, the expression "at least one optical system configured to at least partially collimate light emissions in a forward direction" means a percentage of light rays that exit the optical system along respective rays that are substantially parallel to the forward direction is greater than the percentage of light rays that entered the optical system along respective rays that are substantially parallel to the forward direction. The expression "forward direction," as used herein, means any particular direction, e.g., a direction in which light is desired to be directed, such as substantially perpendicular to a wall and along a ceiling (e.g., grazing the ceiling).

An angular value relative to a first direction, as used herein, means any ray that forms an angle of that value relative to the first direction (i.e., relative to a first ray that extends in the first direction, or relative to any other ray parallel to the first ray). Thus, an expression that an item "reflects a portion of the light emissions more than 90 degrees relative to the forward direction," as used herein, means that for each of a portion of light rays that are incident on the item (e.g., an accessory), the reflected light ray travels in a direction that forms an angle of more than 90 degrees relative to the incident light ray (or relative to a ray that is parallel to the incident light ray). An angular value of 180 degrees relative to a first direction thus refers to a direction that is opposite to the first direction.

The expression "respective total curvatures of the reflection surface decrease progressively," as used herein, means that the total curvature of the reflection surface(s) in each cross-section is less than the total curvature of the protrusion in any cross-section prior in the sequence (the expression does not require that the quantity of the decrease is consistent for each step in the sequence).

The expression "substantially concave," as used herein (e.g., in the expression "the reflector surface is substantially concave"), means that at least 90 percent of the points along the cross-section of the reflector surface follow a concave shape, i.e., a shape that has no inflection point.

The expression "curvature of the reflection surface remains substantially constant," as used herein means that the radius of curvature of the reflection surface (in the specified cross-section) at least 90 percent of the points on the cross-section of the reflection surface correspond to a shape that has a radius of curvature that is in the range of from 95-105 percent of a first value.

The expression "substantially circular," as used herein (e.g., in the expression "the reflection surface is substantially circular in at least one of the sequence of cross-sections"), means that a circle can be drawn having the formula $x^2+y^2=n$, where imaginary axes could be drawn at a location where for each of at least 90 percent of the points on the feature being characterized as "substantially circular", the y coordinate would be within 0.90 to 1.10 times the value obtained by inserting the x coordinate of such point into such formula.

The expression "substantially parabolic," as used herein (e.g., in the expression "the reflection surface is substantially parabolic in at least one of the sequence of cross-sections"), means that a parabola can be drawn where for each of at least 90 percent of the points on the feature being characterized as "substantially parabolic", the y coordinate would be within 0.90 to 1.10 times the value obtained by inserting the x coordinate of such point into the formula for the parabola.

The expression "substantially uniform profile," as used herein (e.g., in the expression "track element cross-sections of the bracket track, taken perpendicular to a bracket track first axis, have a substantially uniform track profile"), means that cross-sections of the item that has cross-sections of substantially uniform profile) are of substantially similar shape.

The expression "substantially parallel," as used herein in relation to two planes, means that the two planes could be made parallel by tilting one of the planes by 5 degrees or less.

The expression "angular location," as used herein in relation to positions on an imaginary circular area, means the location corresponding to an angular value on a circle in which the angular values range from 0 to 360 degrees, with the angular value of 0 degrees (and 360 degrees) at the top of the circle, the angular value of 180 degrees at the bottom of the circle, the angular value of 90 degrees at the farthest point to the right on the circle, etc.

The expression "attached," as used herein in relation to a first element being "attached" to a second element (e.g., in the expression "the plurality of light emitters attached to the housing"), means that the first element cannot be separated from the second element without removing a connector (e.g., a screw or a bolt) or applying a significant force (e.g., at least 100 N, and typically at least 1,000 N). The expression "attached" encompasses situations where the first element is "directly attached" to the second element, as well as situations where the first element is "indirectly attached" to the second element, i.e., where there are one or more intervening elements (e.g., the first element is directly attached to a third element, and the third element is directly attached to the second element, in which case the third element is an "intervening element").

The expression "removably engaged", as used herein, in the context of a first structure being removably engaged with a second structure (e.g., "the light distribution-modifying element being removably engaged with the housing") means that the first structure can be removed from the second structure by hand (e.g., in the field, without any tools), e.g., by exerting a force of 100 ft-lbs or less. The expression "removably engaged" encompasses situations where the first element is "directly removably engaged" to the second element, as well as situations where the first element is "indirectly removably engaged" to the second element, i.e., where there are one or more intervening elements (e.g., the first element is directly attached to a third element, and the third element is removably engaged to the second element, in which case the third element is an "intervening element").

The expression "direct contact or indirect contact," as used herein (e.g., in the expression "each light emitter comprises at least one light-emitting diode in direct contact or indirect contact with at least one lens") means that the first structure, which is in direct contact or indirect contact with a second structure is either (1) in direct contact with the second structure, i.e., the first structure is touching the second structure and there are no intervening structures between the first and second structures at least at some location, or (2) in indirect contact with the second structure, i.e., the first structure is not in direct contact with the second structure, but there are a plurality of structures (including the first and second structures), and each of the plurality of structures is in direct contact with at least one other of the plurality of structures (e.g., the first structure is in direct contact with a third structure, and the second structure is also in direct contact with the third structure).

The expression "slidable," as used herein in relation to a first element being slidable on a second element (e.g., in the expression "the first engagement bracket is slidable on the bracket track"), means that the first element can be moved in relation to the second element only among a limited range of relative locations and orientations (along a substantially straight line, or along a path that is not substantially straight).

The expression "axis of light emission", as used herein in connection with light output from one or more light emitters, means any of several axes (in some cases, two or more of the axes are co-linear), including: (1) an axis along the maximum brightness of light emission from the light emitter, (2) an axis along a mean ray of light emission, (3) an axis that is perpendicular to a substantially flat light-emitting surface of the light emitter, and (4) an axis that is perpendicular to a tangent of a light-emitting surface of the light emitter at a center of the light-emitting surface. A mean ray of light emission is determined by factoring the respective brightnesses of light emitted in each light ray (i.e., each ray in which light is emitted assigned a weight equal to the brightness of light emitted along that ray). As noted herein, a light emitter includes one or more light-emitting devices, and any lens or lenses that is/are in direct or indirect contact with the light-emitting device(s) (and a light emitter can further comprise one or more luminescent materials and/or one or more reflectors), so for a light emitter that includes one or more lenses, the ray (or rays) in which the axis of light emission extends is determined by the profile of light exiting the lens or lenses (i.e., an axis of emission can be altered by a lens).

The expression "alter characteristics of light," as used herein, means to alter any one or more of the luminous flux or the pulse frequency, and/or to alter the color point (i.e., including color T, CCT, saturation, etc.) of the light emitted.

The expression "current carrier," as used herein, means a structure that is configured to carry electrical current (e.g., a wire, a wire bond, a trace, etc.).

Unless otherwise defined, all terms (including technical and scientific terms) used herein have the same meaning as commonly understood by one of ordinary skill in the art to which this invention belongs. Terms and expressions, such as those defined in commonly used dictionaries, should each be interpreted as having a meaning that is consistent with their meaning in the context of the relevant art and the present disclosure, and not in an idealized or overly formal sense (unless expressly so defined herein).

As noted above, in accordance with a first aspect of the present invention, there is provided a lighting device, comprising:

a housing;

at least one light emitting diode attached to the housing;

at least one optical system configured to at least partially collimate light emissions in a forward direction; and an accessory that is removably engaged with the housing and that reflects a portion of the light emissions more than 90 degrees.

As also noted above, in accordance with a second aspect of the present invention, there is provided a lighting device, comprising:

a housing, a plurality of light emitters arranged in a light emitter row, and a light distribution-modifying element, the light distribution-modifying element comprising a body portion and a plurality of light distribution-modifying protrusions, each of the light distribution-modifying protrusions extending away from the body portion from a body portion end to a remote end, the light distribution-modifying protrusions arranged in a protrusion row, the protrusion row substantially parallel to the light emitter row, each light distribution-modifying protrusion comprising at least one reflection surface, and at least some of the plurality of light emitters are aligned with at least some of the plurality of light distribution-modifying protrusions as respective pairs, each aligned pair comprising one of the plurality of light emitters and one of the plurality of light distribution-modifying protrusions, arranged and oriented relative to one another such that for each aligned pair, at least some imaginary lines that extend (1) parallel to an axis of light emission of the light emitter, and (2) through a light emission surface of the light emitter, intersect with the light distribution-modifying protrusion.

As also noted above, in accordance with a third aspect of the present invention, there is provided a light distribution-modifying element, comprising:

a body portion, and a plurality of light distribution-modifying protrusions arranged in a protrusion row, the light distribution-modifying protrusions arranged such that each of a series of lines that are parallel to one another and that each extend in a first plane passes through a respective one of the light distribution-modifying protrusions.

As also noted above, in accordance with a fourth aspect of the present invention, there is provided a lighting device, comprising a housing, a light emitter, and a light distribution-modifying element.

Figure 1:
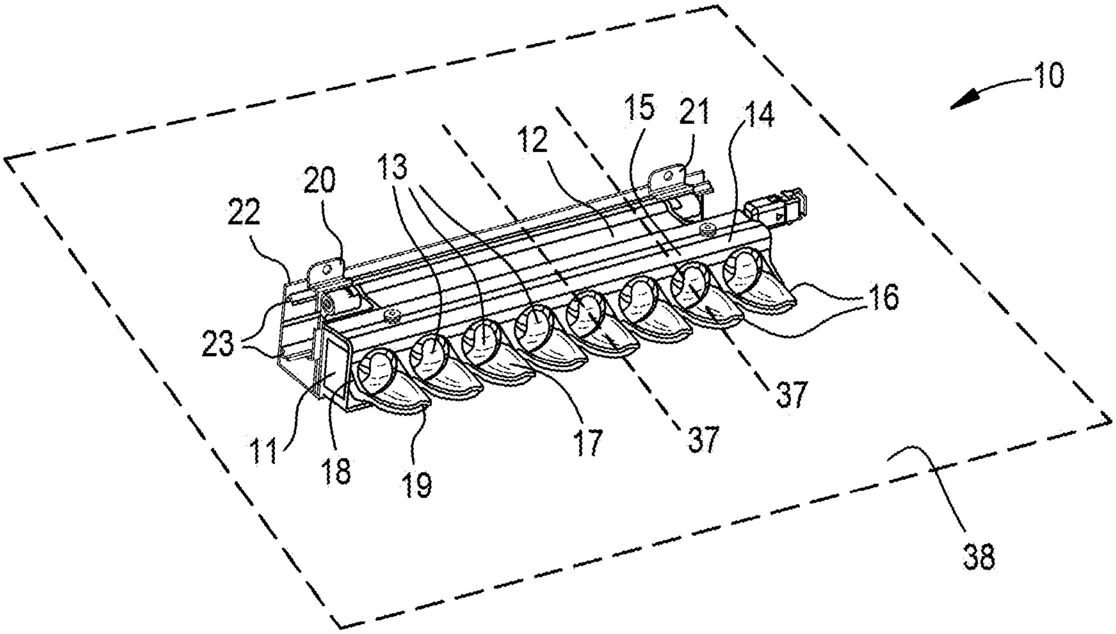
FIG. 1 is a schematic perspective view depicting a first embodiment of a lighting device 10 in accordance with the present invention.

FIG. 1 is a schematic perspective view depicting a first embodiment of a lighting device 10 in accordance with the present invention. The lighting device 10 comprises a housing (which comprises a first housing portion 11 and a second housing portion 12), a plurality of light emitters 13 arranged in a light emitter row, and a light distribution-modifying element 14. The light distribution-modifying element 14 is removably engaged with the first housing portion 11. The light distribution-modifying element 14 comprises a body portion 15 and a plurality of light distribution-modifying protrusions 16, Each light distribution-modifying protrusion 16 comprises a reflection surface 17, and each of the light distribution-modifying protrusions 16 extends away from the body portion 15 from a body portion end 18 to a remote end 19.

The lighting device 10 also comprises a first engagement bracket 20, a second engagement bracket 21, and a track element 22. The track element 22 comprises a bracket track 23. The second housing portion 12 is attached to the first and second engagement brackets 20 and 21, which are slidable on the bracket track 23, whereby the lateral position of the housing can be adjusted in relation to the track element, which can be mounted in a construction surface, e.g., a wall of a room.

Figure 2:
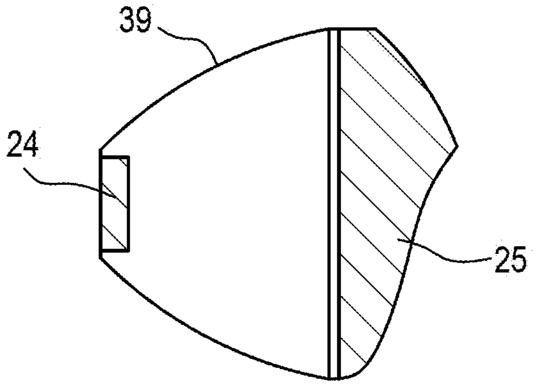
FIG. 2 is a schematic side view depicting one of the light emitters 13.

FIG. 2 is a schematic side view depicting one of the light emitters 13. The light emitter 13 depicted in FIG. 2 comprises a light-emitting device 24 (in the form of a semiconductor light-emitting device) and a lens 25.

Figure 3:
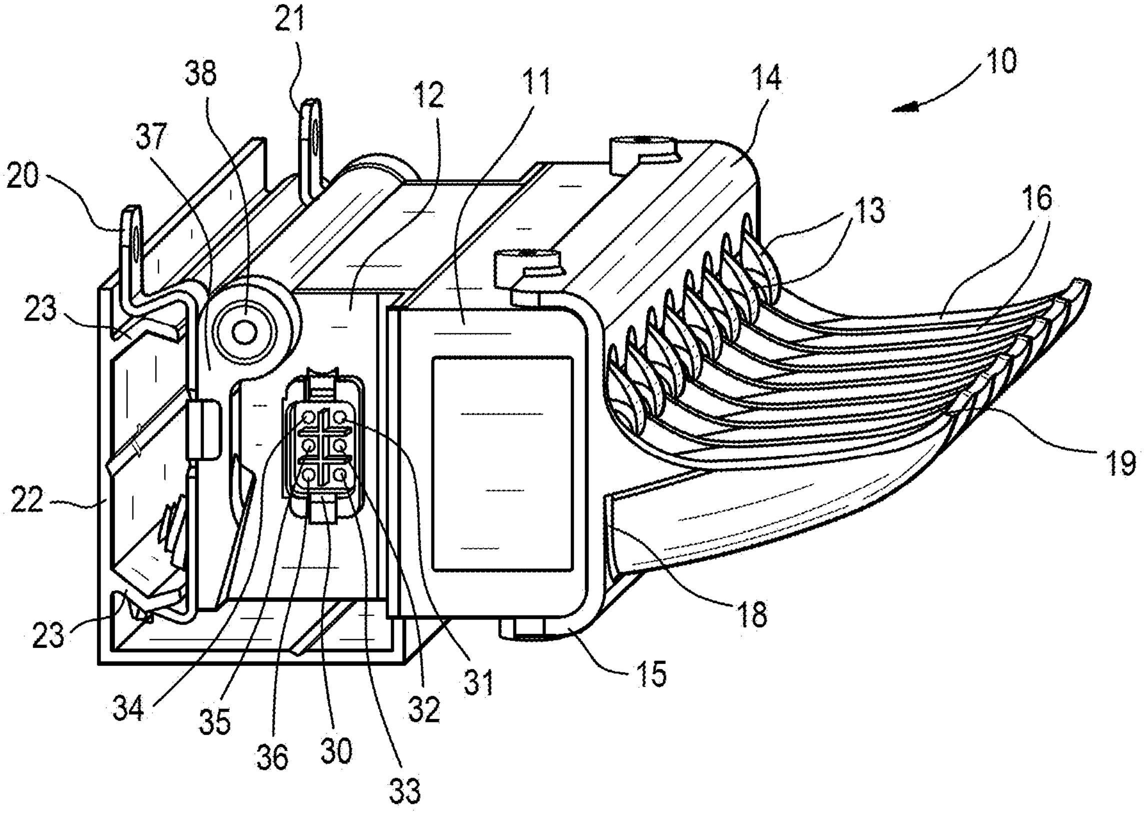
FIG. 3 is a schematic side view of the lighting device 10 depicted in FIG. 1.
Figure 4:
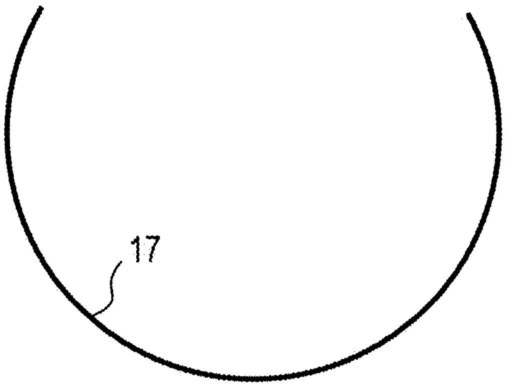
FIGS. 4-7 show sectional views of the reflection surface 17 of one of the light distribution-modifying protrusion 16 alone.
Figure 5:
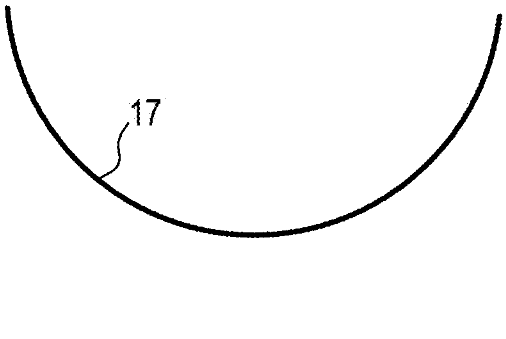
Figure 6:
Figure 7:
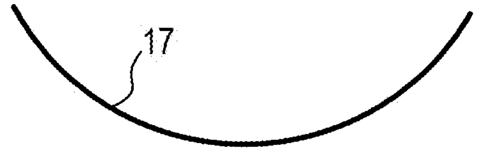

FIG. 3 is a schematic side view of the lighting device 10 depicted in FIG. 1. FIG. 3 shows a first current connector 30, which comprises a first line terminal 31, a first neutral terminal 32, a first ground terminal 33, a second line terminal 34, a second neutral line terminal 35, and a second ground terminal 36.

A wide variety of light emitters are suitable for use in the lighting devices in accordance with the present invention. As noted above, a light emitter comprises one or more light-emitting devices, and may include one or more lenses that is/are in direct or indirect contact with the light-emitting device(s) (and/or one or more luminescent materials and/or one or more reflectors). In other words, a "light emitter" as described herein can comprise or consist of a light-emitting device, and in some embodiments, a light emitter further comprises one or more lenses, one or more luminescent materials and/or one or more reflectors.

In some embodiments of lighting devices in accordance with the present invention, the plurality of light emitters (or the light emitter) are attached to the housing.

Those of skill in the art are familiar with, and have ready access to, a wide variety of light-emitting devices, and any suitable light-emitting devices can be employed in accordance with the present invention.

Representative examples of types of light-emitting devices include incandescent lights, fluorescent lamps, solid state light emitters (e.g., LEDs), laser diodes, thin film electroluminescent devices, light-emitting polymers (LEPs), halogen lamps, high intensity discharge lamps, electron-stimulated luminescence lamps, etc., with or without filters. That is, a light-emitting device can comprise a single light source, a plurality of light sources of a particular type, or any combination of one or more light sources of each of a plurality of types.

As noted above, a light emitter comprises one or more light-emitting devices. In some instances, a light emitter can comprise two or more independent LED chips (e.g., 1 mm×1 mm chips), and in some instances, a light emitter can comprise a plurality of mini LEDs and/or a plurality of micro LEDs.

In some embodiments in accordance with the present invention (i.e., the first and fourth aspects of the present invention), which can include or not include, as suitable, any of the other features described herein, at least one of the plurality of light emitters (or the at least one light emitter) comprises at least one solid state light emitter.

In some embodiments in accordance with the present invention, which can include or not include, as suitable, any of the other features described herein, each of the plurality of light emitters (or the at least one light emitter) comprises at least one solid state light emitter.

In some embodiments in accordance with the present invention, which can include or not include, as suitable, any of the other features described herein, at least one of the plurality of light emitters (or the at least one light emitter) comprises at least one semiconductor light-emitting device.

In some embodiments in accordance with the present invention, which can include or not include, as suitable, any of the other features described herein, each of the plurality of light emitters comprises at least one semiconductor light-emitting device.

The expression "semiconductor light-emitting device" (also abbreviated as "SLED"), as used herein, means: a light-emitting diode; an organic light-emitting diode; a laser diode; or any other light-emitting device having one or more layers containing inorganic and/or organic semiconductor (s). Throughout this specification, the term "light-emitting diode" (herein also referred to as an "LED") means: a two-lead semiconductor light source having an active pn-junction. As examples, an LED may include a series of semiconductor layers that may be epitaxially grown on a substrate such as, for example, a substrate that includes sapphire, silicon, silicon carbide, gallium nitride or gallium arsenide. Further, for example, one or more semiconductor p-n junctions may be formed in these epitaxial layers. When a sufficient voltage is applied across the p-n junction, for example, electrons in the n-type semiconductor layers and holes in the p-type semiconductor layers may flow toward the p-n junction. As the electrons and holes flow toward each other, some of the electrons may recombine with corresponding holes, and emit photons. The energy release is called electroluminescence, and the color of the light, which corresponds to the energy of the photons, is determined by the energy band gap of the semiconductor. As examples, a spectral power distribution of the light generated by an LED may generally depend on the particular semiconductor materials used and on the structure of the thin epitaxial layers that make up the "active region" of the device, being the area where the light is generated. As examples, an LED may have a light-emissive electroluminescent layer including an inorganic semiconductor, such as a Group III-V semiconductor, examples including: gallium nitride; silicon; silicon carbide; and zinc oxide. Throughout this specification, the term "organic light-emitting diode" (herein also referred to as an "OLED") means: an LED having a light-emissive electroluminescent layer including an organic semiconductor, such as small organic molecules or an organic polymer. It is understood throughout this specification that a semiconductor light-emitting device may include: a non-semiconductor-substrate or a semiconductor-substrate; and may include one or more electrically-conductive contact layers. Further, it is understood throughout this specification that an LED may include a substrate formed of materials such as, for example: silicon carbide; sapphire; gallium nitride; or silicon. It is additionally understood throughout this specification that a semiconductor light-emitting device may have a cathode contact on one side and an anode contact on an opposite side, or may alternatively have both contacts on the same side of the device. The expression "LED" is used herein to refer to light-emitting diodes in any arrangement, e.g., LED chips, packaged devices (i.e., devices comprising LED chips, electrical connections, and packaging that encapsulates the light-emitting diode), etc.

Further background information regarding semiconductor light-emitting devices can be obtained in the following documents, the entireties of all of which hereby are incorporated by reference herein: U.S. Pat. Nos. 7,564,180; 7,456,499; 7,213,940; 7,095,056; 6,958,497; 6,853,010; 6,791,119; 6,600,175; 6,201,262; 6,187,606; 6,120,600; 5,912,477; 5,739,554; 5,631,190; 5,604,135; 5,523,589; 5,416,342; 5,393,993; 5,359,345; 5,338,944; 5,210,051; 5,027,168; 5,027,168; 4,966,862; and 4,918,497; and U.S. Patent Application Publication Nos. 2014/0225511; 2014/0078715; 2013/0241392; 2009/0184616; 2009/0080185; 2009/0050908; 2009/0050907; 2008/0308825; 2008/0198112; 2008/0179611; 2008/0173884; 2008/0121921; 2008/0012036; 2007/0253209; 2007/0223219; 2007/0170447; 2007/0158668; 2007/0139923; and 2006/0221272.

Representative specific examples of light-emitting diodes that can be used in lighting devices in accordance with the present invention include InGaN (blue light emitters and green light emitters), and AlInGaP (red light emitters), as well as others such as AlGaAs, GaAs, GaP, AlInGaN, GaN, SiC, ZnSe.

Light-emitting devices that comprise one or more luminescent materials can be employed in embodiments in accordance with the present invention (and/or light emitters can further comprise one or more luminescent materials). A luminescent material is a material that emits a responsive radiation (e.g., visible light) when excited by a source of exciting radiation.

Those of skill in the art are familiar with, and have ready access to, a variety of luminescent materials that emit light having a desired peak emission wavelength and/or dominant emission wavelength, or a desired hue, and any of such luminescent materials, or any combinations of such luminescent materials, can be employed, if desired.

One type of luminescent material are phosphors, which are readily available and well known to persons of skill in the art. Other examples of luminescent materials include scintillators, day glow tapes and inks that glow in the visible spectrum upon illumination with ultraviolet light.

Representative specific examples of luminescent materials that can be used in lighting devices in accordance with the present invention include YAG (cerium-doped yttrium aluminum garnet, also known as YAG:Ce), LuAG (lutetium aluminum, also known as LuAG:Ce), CaAlSiN:Eu2+ (aka "CASN" or "BR01"), and BOSE.

One or more luminescent materials, if employed, can be provided in any suitable form. For example, luminescent material can be embedded in a resin (i.e., a polymeric matrix), such as a silicone material, an epoxy material, a glass material or a metal oxide material, and/or can be applied to one or more surfaces of a resin, e.g., as an encapsulant and/or in a lens or lenses for one or more light-emitting diodes.

In some embodiments in accordance with the present invention, which can include or not include, as suitable, any of the other features described herein, there are at least three light emitters arranged in a row.

In some embodiments in accordance with the present invention, which can include or not include, as suitable, any of the other features described herein, there are eight light emitters arranged in a row, and the light distribution-modifying element comprises eight light distribution-modifying protrusions.

In some embodiments in accordance with the present invention, which can include or not include, as suitable, any of the other features described herein, there are a plurality of light emitters, and for each light emitter, a spacing between the light emitter and each adjacent light emitter is not greater than a largest dimension of a light emission surface of the light emitter.

In some embodiments in accordance with the present invention, which can include or not include, as suitable, any of the other features described herein, there are a plurality of light emitters, and for each of the plurality of light emitters, the axis of emission of the light emitter is substantially parallel to a first imaginary emission line.

In some embodiments in accordance with the present invention, which can include or not include, as suitable, any of the other features described herein, there are a plurality of light emitters, and for each of the plurality of light emitters, the axis of emission of the light emitter is substantially parallel to a first imaginary emission line and all of the respective axes of emission are in a substantially planar emission region.

In some embodiments in accordance with the present invention, which can include or not include, as suitable, any of the other features described herein, at least one of the plurality of light emitters (or the at least one light emitter) comprises at least one light-emitting device and at least one lens. In such embodiments, the lens (or one or more of the lenses) can be in direct contact with the light-emitting device (e.g., an LED) or spaced from it and held in place by the housing (with respect to which the light-emitting device is also held in place) (in direct contact with the housing, or held in place relative to the housing by one or more intervening structures).

In some embodiments in accordance with the present invention, which can include or not include, as suitable, any of the other features described herein, for at least one of the plurality of light emitters (or the at least one light emitter), the light emitter comprises at least one light-emitting device and at least one lens that is asymmetric relative to an axis of emission of the light emitter.

In some embodiments in accordance with the present invention, which can include or not include, as suitable, any of the other features described herein, each light emitter (or the at least one light emitter) comprises at least one light-emitting diode in direct contact or indirect contact with at least one lens.

In some embodiments in accordance with the present invention:

there are a plurality of light emitters, and the plurality of light emitters comprises a number of light emitters that is equal to a number of light distribution-modifying protrusions in the plurality of light distribution-modifying protrusions, each light emitter is in an aligned pair with a light distribution-modifying protrusion, and each light distribution-modifying protrusion is in an aligned pair with a light emitter.

As noted above, a light emitter employed in the present invention may include one or more lenses (e.g., total internal reflection (TIR) optics) that is/are in direct or indirect contact with the light-emitting device(s). Those of skill in the art are familiar with a wide variety of lenses (as well as diffusers and light control elements and the like), can readily envision a variety of materials out of which a lens can be made (e.g., polycarbonate materials, acrylic materials, fused silica, polystyrene, etc.), and are familiar with and/or can envision a wide variety of shapes that lenses can be. Any of such materials and/or shapes can be employed in a lens in an embodiment that includes a lens.

Representative examples of TIR optics lenses comprise solid shapes, formed of any suitable material or materials (e.g., clear acrylic material) designed to receive light at one end, provide total internal reflection of a large portion of light that hits its sidewalls, and to collimate the light before it exits from a light emission surface.

In some embodiments in accordance with the present invention, which can include or not include, as suitable, any of the other features described herein, for each of the plurality of light emitters (or the at least one light emitter):

the light emitter comprises at least one light-emitting device and at least one lens that is asymmetric relative to an axis of emission of the light emitter;

in a cross-section taken in a plane (a) that is perpendicular to an axis of emission of the light emitter, and (b) that extends through a portion of the lens that is closest to a light emission surface of the light-emitting device, the area of the lens is a first substantially circular area;

in a cross-section taken in a plane (a) that is perpendicular to an axis of emission of the light emitter, (b) that extends through a portion of the lens, and (c) that is spaced a first distance from the light emission surface of the light-emitting device, at least 90 percent of the area occupied by the lens is within a region defined by a portion of a second substantially circular area that is (1) below a chord extending between circumferential points at angular locations of 58 degrees and 302 degrees of the second substantially circular area, the second substantially circular area corresponding to the first substantially circular area translated along the axis of emission by a distance equal to the first distance;

in a cross-section taken in a plane (a) that is perpendicular to an axis of emission of the light emitter, (b) that extends through a portion of the lens, and (c) that is spaced a second distance from the light emission surface of the light-emitting device, the second distance larger than the first distance, at least 90 percent of the area occupied by the lens is within a region defined by a portion of a third substantially circular area that is (1) below a chord extending between circumferential points at angular locations of 85 degrees and 275 degrees of the third substantially circular area, and (2) above a chord extending between circumferential points at angular locations of 150 degrees and 210 degrees of the third substantially circular area, the third substantially circular area corresponding to the first substantially circular area translated along the axis of emission by a distance equal to the second distance;

in a cross-section taken in a plane (a) that is perpendicular to an axis of emission of the light emitter, (b) that extends through a portion of the lens, and (c) that is spaced a third distance from the light emission surface of the light-emitting device, the third distance larger than the second distance, at least 90 percent of the area occupied by the lens is within a region defined by a portion of a fourth substantially circular area that is (1) below a chord extending between circumferential points at angular locations of 104 degrees and 256 degrees of the fourth substantially circular area, and (2) above a chord extending between circumferential points at angular locations of 132 degrees and 228 degrees of the fourth substantially circular area, the fourth substantially circular area corresponding to the first substantially circular area translated along the axis of emission by a distance equal to the third distance, and in some of such embodiments:

no portion of the lens is in a cross-section taken in a plane (a) that is perpendicular to an axis of emission of the light emitter, and (b) that is spaced a fourth distance from the light emission surface of the light-emitting device, the fourth distance larger than the third distance;

a difference between the first distance and the second distance is equal to the first distance;

a difference between the second distance and the third distance is equal to the first distance; and a difference between the third distance and the fourth distance is equal to the first distance.

In some embodiments in accordance with the present invention, which can include or not include, as suitable, any of the other features described herein, there are a plurality of light emitters, and for each of the plurality of light emitters:

the light emitter comprises at least one light-emitting device and at least one lens that is asymmetric relative to an axis of emission of the light emitter, and the respective lenses of each of the plurality of light emitters each have a substantially similar shape.

In some embodiments in accordance with the present invention, which can include or not include, as suitable, any of the other features described herein, for each of the plurality of light emitters (or the at least one light emitter):

the light emitter comprises at least one light-emitting device and at least one lens, the lens is substantially symmetrical relative to a lens plane of symmetry, and the lens is asymmetric relative to an axis of emission of the light emitter, and in some of such embodiments, for each lens:

the lens has a light-emitting device-facing surface and a light emission surface, in a cross-section, taken in the lens plane of symmetry:

for a sequence of points along the light emission surface, starting at a first end of the cross-section of the light emission surface and finishing at a second end of the cross-section of the light emission surface:

respective distances between the point and a nearest point on the light-emitting device-facing surface progressively increase for a first distance along the cross-section of the light emission surface until reaching a maximum value, and then progressively decrease until reaching the second end of the cross-section of the light emission surface.

In some of these embodiments, the first distance along the cross-section of the light emission surface is intersected by an imaginary line that extends through the light-emitting device-facing surface and that intersects the light-emitting device-facing surface at a location that is spaced from the point at the first end of the cross-section of the light emission surface by a distance that is equal to about 25 to 40 percent of the distance between the first end of the cross-section of the light emission surface and the second end of the cross-section of the light emission surface.

In some of embodiments, two or more lenses, and in some embodiments each of the lenses, are substantially symmetrical relative to respective lens planes of symmetry, each of which are substantially parallel to one another, and in some embodiments, in addition, each of the respective lenses has a plane of symmetry that encompasses an axis of emission of the light emitter with which the lens is aligned.

Light distribution-modifying elements in accordance with the present invention can be made of any of a wide variety of materials (or combinations of materials) shaped as described herein. Suitable materials for the light distribution-modifying elements include plastic materials, metallic materials, porcelain, ceramic, wood, etc.

As noted above, light distribution-modifying elements in accordance with the present invention comprise a body portion and a plurality of light distribution-modifying protrusions (which are integral with the body portion). In some embodiments, the body portion and a plurality of light distribution-modifying protrusions together are a unitary one-piece element.

As noted above, each light distribution-modifying protrusion comprises at least one reflection surface. A reflection surface can be any surface that causes incident visible light, upon reaching the surface, to then propagate in one or more different light rays away from the surface without passing through the surface (or the object on which the reflection surface is). Those of skill in the art are familiar with a wide variety of materials and ways to provide a reflection surface, e.g., by using a reflective material to make the light distribution-modifying protrusion (or a portion thereof), by applying one or more reflective materials to a light distribution-modifying protrusion, and/or by treating a surface of a light distribution-modifying protrusion to be reflective (or more reflective). A representative example of a reflection surface is a surface that is 99% diffuse white reflective.

As noted above, in some embodiments in accordance with the present invention, the light distribution-modifying element is removably engaged with the housing. As also noted above, the expression "removably engaged," as used herein, means that the light distribution-modifying element can be removed from the housing by hand (e.g., in the field, without any tools), e.g., by exerting a force of 100 ft-lbs or less.

Those of skill in the art are familiar with a wide variety of ways to provide such removable engagement, e.g., by a small clamping force, such as light compression (for example, the concave side of a structure with a generally C-shaped cross-section (in the case of the embodiment depicted in FIGS. 1 and 3, with an elongated center section of the "C") lightly compressing against the curved side of a structure with a generally D-shaped cross-section (in the case of the embodiment depicted in FIGS. 1 and 3, with elongated straight regions in the curved sides of the "D") because the interior height (in the orientation shown in FIG. 3) of the concave side of the "C" is (without force being exerted on the light distribution-modifying element) is slightly less than the exterior height of the curved side of the "D." A wide variety of other ways to provide removable engagement (e.g., field-replaceability) can be envisioned by those of skill in the art, e.g., structural engagement (such as other clamping arrangements), hand-manipulable connector (e.g., a hand-twistable screw or bolt, a slidable lock), magnets, electromagnets, etc.

In another aspect, the present invention is directed to sets that comprise a housing and a light distribution-modifying element, as well as to sets that comprise a housing and two or more light distribution-modifying elements that (1) provide respective differing effects on light emitted from light emitters attached to the housing, and (2) each can be readily removably engaged with the housing (such embodiments provide a higher level of flexibility for altering light patterns, especially to further accommodate differences among construction sites, or characteristics thereof, encountered when installing lighting devices).

Housings for lighting devices in accordance with the present invention can be made of any of a wide variety of materials (or combinations of materials), and can be in any suitable shape, in compliance with applicable safety standards. Those of skill in the art are familiar with a wide variety of such materials, e.g., metal (such as aluminum, or steel (e.g., stainless steel), cast iron, etc.), plastic (such as polycarbonate, ABS or PVC), or fiberglass.

In some embodiments, a housing can comprise two or more compartments. In such embodiments, any suitable arrangement of housing portions and/or compartments, and the respective shapes thereof, can be employed. In some embodiments, a circuit board (or boards), drivers and light-emitting devices are provided in a first housing portion, and current carriers are provided in a second housing portion (and current connectors are mounted in or on such second housing portion).

In some embodiments of lighting devices in accordance with the present invention, each light emitter comprises an LED and a TIR lens with a respective profile that has individualized features for that LED, and the lighting device comprises a housing (e.g., of aluminum) that covers areas of the TIR lenses that are not optically active, i.e., there are portholes in the housing through which each of the light distribution-modifying protrusions extend from the respective fronts of the TIR lenses. In such embodiments, "crosstalk" through the lenses is decreased to a surprising extent. Crosstalk can be problematic where lenses are unitary, because stray light from one LED position frequently leaks into a different portion of the lens, which causes streaks of light (striations), visible in the near field, that lighting designers typically deem objectionable. By blocking the areas of the lens that are not intended to be optically active, such striations are reduced or minimized.

As noted above, some embodiments of the present invention comprise one or more engagement brackets and a track element that comprises a bracket track on which the engagement bracket(s) is/are slidable. Those of skill in the art are familiar with, and/or would envision, a wide variety of shapes and sizes for engagement brackets and track elements (e.g., the one depicted in FIG. 3), by which engagement brackets are attached to a housing and are slidable relative to a bracket track. In some embodiments, lighting devices according to the present invention can be mounted on a construction surface, e.g., a wall of a room by first securing a bracket track to the construction surface, and then engaging the engagement bracket(s) (with the housing attached thereto) to the bracket track. In some situations, if desired, a lighting device according to the present invention can be formed and installed such that the lateral position of the housing can be adjusted in relation to the track element; in other situations, a lighting device according to the present invention can be formed and installed such that the engagement of the engagement bracket(s) with the bracket track positions the housing relative to the bracket track (and/or secures the housing in place relative to the bracket track, and, e.g., a construction surface to which the bracket track is attached) but does not allow for (or provide for) adjustment of the lateral position of the housing in relation to the track element.

In some embodiments, at least part of the housing is pivotable relative to the track element about a pivot axis that is parallel to or substantially parallel to the light emitter row. In some of such embodiments, the housing further comprises at least one mounting foot that is pivotally attached to another portion (or portions) of the housing, defining a pivot axis that is parallel to or substantially parallel to the light emitter row, and the engagement bracket (or brackets) is/are attached to the mounting foot (feet). In such embodiments, if desired, the housing (along with the plurality of light emitters arranged in a light emitter row and the light distribution-modifying element) can be free to rotate about the pivot axis, to allow for (or provide for) adjustment of the angular position of the housing in relation to the track element.

In some embodiments of lighting devices in accordance with the present invention:

the housing extends in a first direction at least twice as far as it extends in any other direction orthogonal to the first direction, the lighting device comprises first and second engagement brackets and a track element that comprises a bracket track, the first and second engagement brackets are each attached to the housing, the first and second engagement brackets are each slidable along the bracket track, and the second engagement bracket is spaced from the first engagement bracket in the first direction.

In some embodiments of lighting devices according to the present invention, that comprise first and second engagement brackets and a track element comprising a bracket track, track element cross-sections of the bracket track, taken perpendicular to a bracket track first axis, have a substantially uniform track profile.

As noted above, in some embodiments in accordance with the present invention, the lighting device comprises:

at least first and second electrical current connectors;

at least two current carriers, comprising at least a first line current carrier and at least a first neutral current carrier; and the first line current carrier and the first neutral current carrier are configured to provide respective current paths between the first and second electrical current connectors, and to provide current to at least one of the light emitters.

Such embodiments provide the capability to easily string multiple lighting devices together in series, by connecting either or both of the first and second electrical current connectors of one lighting device with an electrical current connector of another lighting device.

Some of such embodiments further comprise at least one ground current carrier that is configured to provide a current path between the first and second electrical current connectors, and to provide a ground for at least one of the light emitters.

In some of such embodiments:

the lighting device further comprises at least a second line current carrier and a second neutral current carrier, the lighting device further comprises at least a first driver, and the second line current carrier and the second neutral current carrier are configured to provide respective current paths between the first and second electrical current connectors, and to provide control signals to at least the first driver, the control signals and the at least a first driver configured to alter at least one characteristic of light emitted from at least one of the light emitters.

In embodiments in accordance with the present invention that comprise at least one line current carrier and at least one neutral current carrier configured to provide current to light emitters, the light emitters can be arranged in any suitable electrical configuration, e.g., in series, in parallel, in series-parallel, etc.

The present invention now will be described more fully hereinafter with reference to the accompanying drawings, in which a representative embodiment of the invention is shown. The present invention should not be construed as being limited to the specific features in the embodiments set forth herein.

As noted above, FIGS. 1 and 3 depict an embodiment of a lighting device in accordance with the present invention. Referring again to FIGS. 1 and 3:

each of the plurality of light emitters 13 has a respective axis of light emission 37 (see FIG. 1), the light distribution-modifying protrusions 16 are arranged in a protrusion row, the protrusion row is substantially parallel to the light emitter row, and each of the plurality of light emitters 13 is aligned with one of the plurality of light distribution-modifying protrusions 16 as a respective pair, each aligned pair comprising one of the light emitters 13 and one of the light distribution-modifying protrusions 16, arranged and oriented relative to one another such that for each aligned pair, at least some imaginary lines that extend (1) parallel to the axis of light emission of the light emitter, and (2) through a light emission surface of the light emitter 13, intersect with the light distribution-modifying protrusion 16.

The presence of the light distribution-modifying element 14 causes a greater percentage of light emitted by the plurality of light emitters 13 to travel from a second side of a light distribution imaginary plane 38 (see FIG. 1) to a first side of the light distribution imaginary plane 38 than if the light distribution-modifying element 14 were not present, the light distribution imaginary plane 38 (1) encompassing the axes of emission of the light emitters 16 and (2) extending through each of the light distribution-modifying protrusions 16, the first side of the light distribution imaginary plane and the second side of the light distribution imaginary plane on opposite sides of the light distribution imaginary plane 38.

For each reflection surface 17, a greater percentage of an area of the reflection surface 17 is to the second side of the light distribution imaginary plane 38 than to a first side of the light distribution imaginary plane 38.

Figure 8:
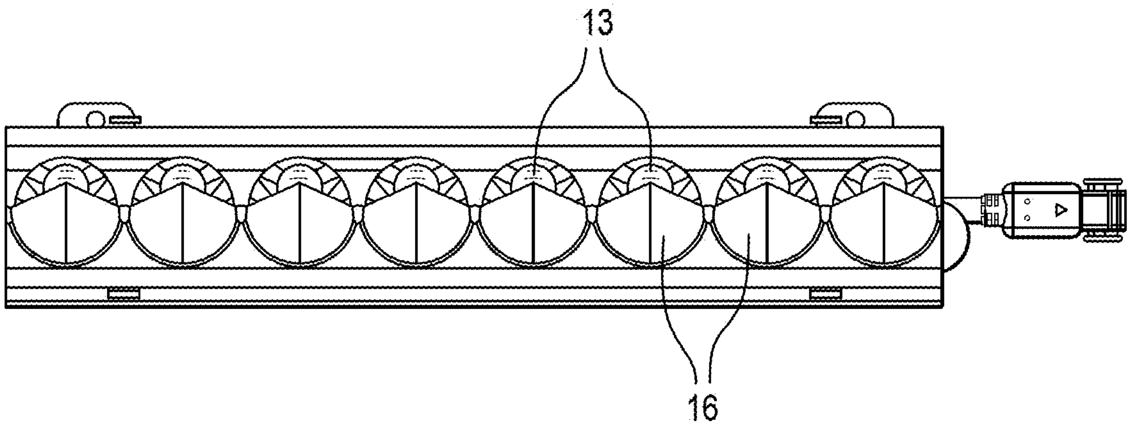
FIG. 8 shows a front view taken at the locations of the remote ends of the light distribution-modifying protrusions.

FIGS. 4-7 show sectional views of the reflection surface 17 of one of the light distribution-modifying protrusion 16 alone, and FIG. 8 shows a front view taken at the locations of the remote ends of the light distribution-modifying protrusions.

For each aligned pair (or light distribution-modifying protrusion):

in a sequence of respective cross-sections of the protrusion 16 in a sequence of first through fifth imaginary planes that are each perpendicular to an axis of emission of the light emitter 13 and that are spaced in increments from the body portion end 18 of the protrusion 16, each increment equal to 25 percent of a distance between the body portion end 18 of the protrusion 16 and the remote 19 end of the protrusion 16, the first imaginary plane extending through the body portion end 18 of the protrusion 16, the fifth imaginary plane farthest from the body portion end 18 of the protrusion 16 and comprising the remote end 19 of the protrusion 16 (and likewise in first through twenty-first imaginary planes that are each spaced in increments equal to 5 percent of the distance between the body portion end 18 and the remote 19) (i.e., corresponding, respectively, to the sectional views depicted in FIGS. 4-7 and the front view depicted in FIG. 8):

respective total curvatures of the light distribution-modifying protrusion 16 decrease progressively;

in a cross-section of the protrusion in the first of the sequence of planes, the reflection surface 17 has a total curvature of about 240 degrees;

in a cross-section of the protrusion in the second of the sequence of planes, the reflection surface 17 has a total curvature of about 170 degrees;

in a cross-section of the protrusion in the third of the sequence of planes, the reflection surface 17 has a total curvature of about 140 degrees;

in a cross-section of the protrusion in the fourth of the sequence of planes, the reflection surface 17 has a total curvature of about 120 degrees;

in a cross-section of the protrusion in the fifth of the sequence of planes, the reflection surface 17 has a total curvature of 0 degrees;

a length of the reflection surface 17 decreases progressively;

a curvature of the reflection surface 17 remains substantially constant;

the reflection surface 17 is substantially circular in some of the cross-sections;

a distance between the reflection surface 17 and a lower imaginary plane progressively increases, the lower imaginary plane is parallel to the light distribution imaginary plane 38 and below (in the orientation depicted in FIG. 1) the light distribution imaginary plane 38; and the reflector surface is substantially concave.

As reflected above, the embodiment of FIG. 1 satisfies a number of features. In some aspects, the present invention is directed to lighting devices that satisfy all of the features listed above in the preceding sentence, or any combination of two or more of these features.

Also, for each aligned pair:

in a cross-section in a plane that includes the axis of emission 37 of the light emitter 13 and is perpendicular to the light distribution imaginary plane 38:

angles of incidence, relative to the reflection surface 17 of the light distribution-modifying protrusion 16, of imaginary lines parallel to the axis of emission 37 of the light emitter 13, are greater at greater distances from the light emitter 13.

As seen in FIGS. 1 and 3, each of the plurality of light distribution-modifying protrusions has a substantially similar shape.

Figure 9:
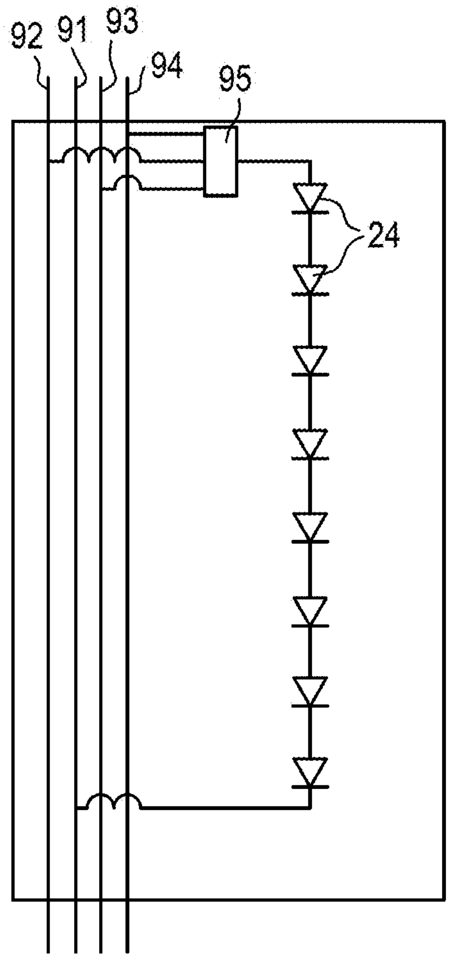
FIG. 9 is a schematic depiction of current carriers, a driver and light-emitting devices in an embodiment.

The lighting device 10 further comprises:

a second electrical current connector (not visible in FIG. 3, on an opposite side of the lighting device 10 relative to the first electrical current connector 30; and at least two current carriers, comprising at least a first line current carrier 91 (see FIG. 9, which is a schematic depiction) and at least a first neutral current carrier 92, and the first line current carrier 91 and the first neutral current carrier 92 are configured to provide respective current paths between the first and second electrical current connectors, and to provide current to the light emitters 13. FIG. 9 also shows that the lighting device 10 further comprises a second line current carrier 93 and a second neutral current carrier 94 which are configured to provide respective current paths between the first and second electrical current connectors, and to provide current to a driver 95 that supplies power to the light emitters 13. In other embodiments the electrical arrangement can differ, e.g., the light emitters can be arranged electrically in parallel or in series-parallel, and/or each light emitter has a driver (or one or more drivers is/are shared by two or more light emitters, and/or ground current carriers can be provided.

Each of the light emitters comprises an LED and a TIR lens that is asymmetric relative to an axis of emission of the light emitter. Each of the TIR lenses is substantially symmetrical relative to a lens plane of symmetry (each lens plane of symmetry is parallel to each other and substantially vertical in the orientation depicted in FIG. 3).

The housing further comprises first and second mounting feet 37 (one of which is visible in FIG. 3), that are pivotally attached to the second housing portion 12, and to which the first and second engagement brackets 20 and 21 are, respectively, attached. The pivoting relationship between each mounting foot 37 and the second housing portion 12 can be provided in any of a wide variety of ways, e.g., by the second housing portion 12 including substantially cylindrical projections 38 that extend through and are rotatable relative to substantially cylindrical projection-receiving openings in the mounting feet 37. The mounting feet can also include one or more feature to facilitate attachment to the engagement brackets 20 and 21, e.g., one or more holes which can be aligned with one or more holes in the alignment brackets, bolts that each extend through a hole in a mounting foot and a hole in an alignment bracket, and nuts that hold the bolt in place. This arrangement provides a pivot axis that is parallel to the light emitter row, and the engagement bracket (or brackets) is/are attached to the mounting foot (feet). In such embodiments, if desired, the housing (along with the plurality of light emitters arranged in a light emitter row and the light distribution-modifying element) can be free to rotate about the pivot axis, to allow for (or provide for) adjustment of the angular position of the housing in relation to the track element.

Embodiments in accordance with the present invention are described herein in detail in order to provide exact features of representative embodiments that are within the overall scope of the present invention. The present invention is not limited to such detail.

Figure 10:
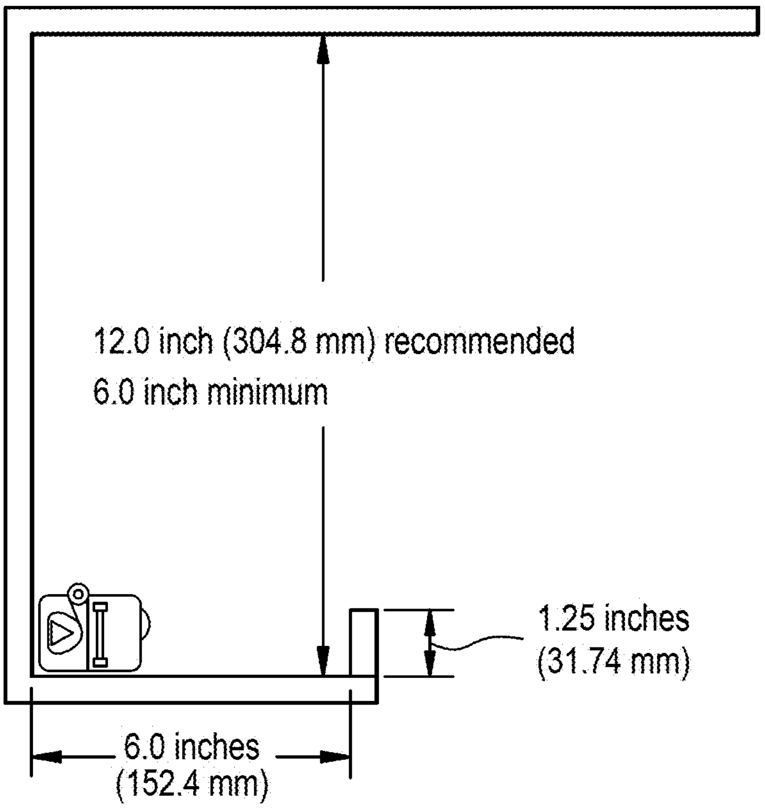
FIG. 10 is a schematic view of a typical mounting configuration for a fixture (e.g., a lighting device in accordance with the present invention).

FIG. 10 is a schematic view of a typical mounting configuration for a fixture (e.g., a lighting device in accordance with the present invention).

Shown in cross-section in FIG. 11 is an asymmetric light distribution of a lighting device (including a light-emitting device 24, a lens 25 and a reflective cup 39) without a field-installable light distribution-modifying element, and shown in cross-section in FIG. 12 is an asymmetric light distribution of a lighting device in accordance with the present invention, including the lighting device of FIG. 11 with a light distribution-modifying element in place. "Ray traces" shown are for illustration purposes to show how the light distribution-modifying element changes the optical distribution.

Longer lines represent higher outputs, and shorter lines represent lower intensity outputs. For illustration purposes only—the light rays do not emit from a point on the front of the lens.

With the addition of the highly reflective (99% diffuse white reflective) light distribution-modifying element, light that would otherwise be spill light, effectively aimed at the opposite wall, is redirected, e.g., in cases where the lighting device is mounted in a cove, back into the cove to provide a brighter cove than the distribution without the light distribution-modifying element. Lines in FIG. 12 show the extension of the lower light rays and the reflected light rays from the light distribution-modifying element.

Figure 15:
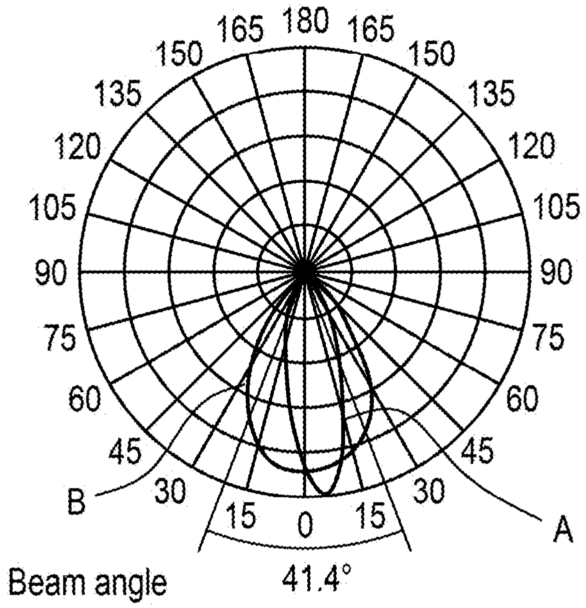
Figure 16:
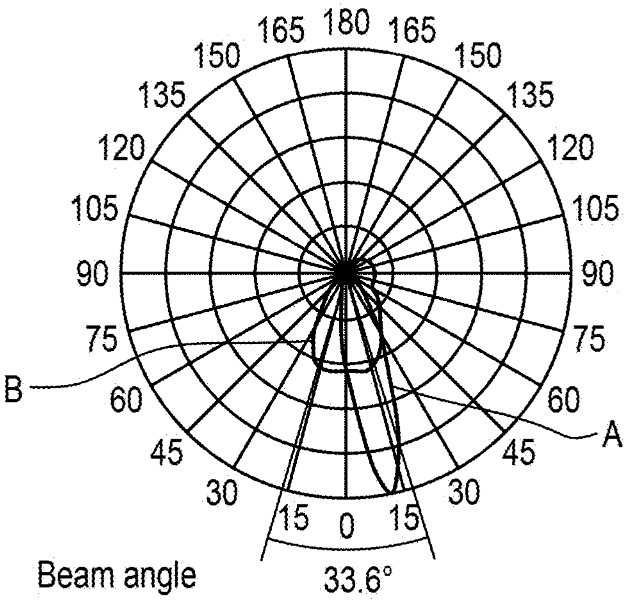

FIGS. 13-16 show the polar distribution of a) a typical graze (10 degree symmetric) (FIG. 13), b) a typical wash (20 degree symmetric) (FIG. 14), c) a lighting device without a light distribution-modifying element (FIG. 15), and d) a lighting device with a light distribution-modifying element (FIG. 16). The typical graze and wash, being symmetric distributions, would be unsuited to ceiling wash applications, as they would provide hot spots at the aiming points and would have insufficient spread along the linear axis of the fixture to provide even illumination regardless of protrusions from the ceiling. (Graze and wash fixtures, by the nature of their distributions, would cause harsh shadows from any non-uniformity in the ceiling.)

The lighting device in FIG. 15 (without a light distribution-modifying element) provides a wide overlap between fixtures (distribution along the fixture axis, shown in curve B) and a non-symmetric distribution skewed above the plane parallel to the ceiling (shown in curve A). The addition of the light distribution-modifying element limits the light allowed to exit the fixture below the plane parallel to the ceiling to almost zero, narrows the distribution in both the along-axis (red) and across axis distributions (blue), and provides a "bubble" of additional output directly above and even behind the fixture itself (reflected light from the kicker).

The impact of these distributions on simulated performance is tabulated in the following Tables. Comparisons are made among four lighting devices, including the commercially available TROV 1.0 (L50) Asymmetric (Device 1), the commercially available 12 CP12 (Device 2), and two asymmetric lighting devices (Devices 3 and 4) that are similar, except that is without a light distribution-modifying element, and one has a light distribution-modifying element (for each of the asymmetric lighting devices, individual fixture output is set to 2,000 lumens before 0.85 applied maintenance factor (to simulate degradation over time, dust on fixtures and surfaces, reduced output, etc.)). Each product is simulated at both 6" and 12" cove heights and modeled with both 80% reflective coves and 30% reflective coves.

TABLE 1 maintained ceiling illuminance (FC) from 40 fixtures in a room, on two opposite coves at 6 inches below the ceiling, cove having 80 percent reflectance

| Device | Avg. | Max | Min | Avg/Min | Max/Min |
|---|---|---|---|---|---|
| 1 | 74.35 | 433.5 | 4.6 | 16.16 | 94.24 |
| 2 | 103.47 | 806.8 | 7.0 | 14.78 | 115.26 |
| 3 | 144.14 | 710.8 | 9.7 | 15.99 | 73.28 |
| 4 | 168.69 | 900.5 | 10.9 | 15.48 | 82.61 |

Device 1: TROV 1.0 (L50) Asymmetric

Device 2: i2 CP12

Device 3: asymmetric lighting device without a light distribution-modifying element Device 4: the asymmetric lighting device with a light distribution-modifying element

TABLE 2

| maintained ceiling illuminance (FC) from 40 fixtures in a room, on two opposite coves at 12 inches below the ceiling, cove having 80 percent reflectance | | | | | |
|---|---|---|---|---|---|
| Device | Avg. | Max | Min | Avg/Min | Max/Min |
| 1 | 67.79 | 229.6 | 14.3 | 4.74 | 16.06 |
| 2 | 100.56 | 495.0 | 9.9 | 10.16 | 50.00 |
| 3 | 145.62 | 331.3 | 35.5 | 4.10 | 9.33 |
| 4 | 166.15 | 485.6 | 26.1 | 6.37 | 18.61 |

Device 1: TROV 1.0 (L50) Asymmetric
Device 2: i2 CP12
Device 3: asymmetric lighting device without a light distribution-modifying element
Device 4: the asymmetric lighting device with a light distribution-modifying element

TABLE 3

| maintained ceiling illuminance (FC) from 40 fixtures in a room, on two opposite coves at 6 inches below the ceiling, cove having 30 percent reflectance | | | | | |
|---|---|---|---|---|---|
| Device | Avg. | Max | Min | Avg/Min | Max/Min |
| 1 | 52.38 | 239.1 | 3.0 | 17.46 | 79.70 |
| 2 | 90.85 | 687.6 | 6.0 | 15.14 | 114.60 |
| 3 | 127.37 | 468.1 | 7.8 | 16.33 | 60.01 |
| 4 | 150.49 | 743.9 | 9.4 | 16.01 | 79.14 |

Device 1: TROV 1.0 (L50) Asymmetric
Device 2: i2 CP12
Device 3: asymmetric lighting device without a light distribution-modifying element
Device 4: the asymmetric lighting device with a light distribution-modifying element

TABLE 4

| maintained ceiling illuminance (FC) from 40 fixtures in a room, on two opposite coves at 12 inches below the ceiling, cove having 30 percent reflectance | | | | | |
|---|---|---|---|---|---|
| Device | Avg. | Max | Min | Avg/Min | Max/Min |
| 1 | 49.93 | 117.2 | 12.1 | 4.13 | 9.69 |
| 2 | 91.82 | 435.2 | 8.7 | 10.55 | 50.02 |
| 3 | 129.42 | 287.8 | 33.9 | 3.82 | 8.49 |
| 4 | 154.24 | 409.9 | 24.6 | 6.27 | 16.66 |

Device 1: TROV 1.0 (L50) Asymmetric
Device 2: i2 CP12
Device 3: asymmetric lighting device without a light distribution-modifying element
Device 4: the asymmetric lighting device with a light distribution-modifying element

TABLE 5

| maintained workplane (30 inches above the finished floor) illuminance (FC) from 40 fixtures in the room, on two opposite coves at 6 inches below the ceiling, cove having 80 percent reflectance | | | | | |
|---|---|---|---|---|---|
| Device | Avg. | Max | Min | Avg/Min | Max/Min |
| 1 | 23.38 | 29.5 | 16.2 | 1.44 | 1.82 |
| 2 | 28.12 | 34.8 | 18.3 | 1.54 | 1.90 |
| 3 | 62.16 | 76.5 | 43.8 | 1.42 | 1.75 |
| 4 | 56.64 | 72.5 | 38.3 | 1.48 | 1.89 |

Device 1: TROV 1.0 (L50) Asymmetric
Device 2: i2 CP12
Device 3: asymmetric lighting device without a light distribution-modifying element
Device 4: the asymmetric lighting device with a light distribution-modifying element

TABLE 6

| maintained workplane (30 inches above the finished floor) illuminance (FC) from 40 fixtures in the room, on two opposite coves at 12 inches below the ceiling, cove having 80 percent reflectance | | | | | |
|---|---|---|---|---|---|
| Device | Avg. | Max | Min | Avg/Min | Max/Min |
| 1 | 27.91 | 34.5 | 19.0 | 1.47 | 1.82 |
| 2 | 37.38 | 48.0 | 25.0 | 1.50 | 1.92 |
| 3 | 66.10 | 80.8 | 45.2 | 1.46 | 1.79 |
| 4 | 68.18 | 85.7 | 46.4 | 1.47 | 1.85 |

Device 1: TROV 1.0 (L50) Asymmetric
Device 2: i2 CP12
Device 3: asymmetric lighting device without a light distribution-modifying element
Device 4: the asymmetric lighting device with a light distribution-modifying element

TABLE 7

| maintained workplane (30 inches above the finished floor) illuminance (FC) from 40 fixtures in the room, on two opposite coves at 6 inches below the ceiling, cove having 30 percent reflectance | | | | | |
|---|---|---|---|---|---|
| Device | Avg. | Max | Min | Avg/Min | Max/Min |
| 1 | 17.72 | 23.0 | 11.6 | 1.53 | 1.98 |
| 2 | 24.73 | 30.3 | 16.0 | 1.55 | 1.89 |
| 3 | 54.83 | 68.1 | 38.8 | 1.41 | 1.76 |
| 4 | 51.41 | 66.5 | 34.2 | 1.50 | 1.94 |

Device 1: TROV 1.0 (L50) Asymmetric
Device 2: i2 CP12
Device 3: asymmetric lighting device without a light distribution-modifying element
Device 4: the asymmetric lighting device with a light distribution-modifying element

TABLE 8

| maintained workplane (30 inches above the finished floor) illuminance (FC) from 40 fixtures in the room, on two opposite coves at 12 inches below the ceiling, cove having 30 percent reflectance | | | | | |
|---|---|---|---|---|---|
| Device | Avg. | Max | Min | Avg/Min | Max/Min |
| 1 | 21.29 | 26.2 | 14.4 | 1.48 | 1.82 |
| 2 | 33.83 | 43.5 | 22.5 | 1.50 | 1.93 |
| 3 | 59.23 | 71.8 | 40.3 | 1.47 | 1.78 |
| 4 | 63.35 | 79.5 | 43.0 | 1.47 | 1.85 |

Device 1: TROV 1.0 (L50) Asymmetric
Device 2: i2 CP12
Device 3: asymmetric lighting device without a light distribution-modifying element
Device 4: the asymmetric lighting device with a light distribution-modifying element While the L50 (TROV 1.0) ASYM provides better Max/Min ratios than the i2 product, the i2 has been judged by some customers to be superior.

The asymmetric lighting device with a light distribution-modifying element (Device 4 in Tables 1-8) shows lower Max/Min ratios than the i2, while also providing substantial back-reflected light to illuminate the cove itself.

AGI32 simulations were also carried out for each of the four designs. In simulation, the asymmetric lighting device without a light distribution-modifying element does not exhibit any dark regions in any configuration. However, the present inventors have determined that despite such simulations, dark regions do occur (particularly above the lighting device mounted in a cove), and the light distribution-modifying element is provided in accordance with the present invention to enable a higher degree of cove illumination to be achieved (e.g., as an easy field upgrade, without the need to remove and replace fixtures), if desired or required.

Based on the information provided in the present disclosure, many alterations and modifications may be made by those having ordinary skill in the art, given the benefit of the present disclosure, without departing from the teaching of the present specification, and/or without departing from the spirit and scope of the present invention.

The invention claimed is:

1. A lighting device, comprising:

a housing;

a plurality of light emitters arranged in a light emitter row, the plurality of light emitters attached to the housing;

an accessory that is removably engaged with the housing and that reflects a portion of the light emissions more than 90 degrees relative to a forward direction, the accessory comprising a body portion and a plurality of light distribution-modifying protrusions, each of the light distribution-modifying protrusions extends away from the body portion from a body portion end to a remote end, the light distribution-modifying protrusions are arranged in a protrusion row, the protrusion row is substantially parallel to the light emitter row, and the light emitter row includes all of the light emitters in the lighting device, an imaginary line segment extending through each of the light emitters in the lighting device.

2. The lighting device as recited in claim 1, wherein:

at least some of the plurality of light emitters are aligned with at least some of the plurality of light distribution-modifying protrusions as respective pairs, each aligned pair comprising one of the plurality of light emitters and one of the plurality of light distribution-modifying protrusions, arranged and oriented relative to one another such that for each aligned pair, at least some imaginary lines that extend (1) parallel to an axis of light emission of the light emitter, and (2) through a light emission surface of the light emitter, intersect with the light distribution-modifying protrusion.

3. The lighting device as recited in claim 1, wherein:

the lighting device further comprises:

at least first and second electrical current connectors; and at least two current carriers, comprising at least a first line current carrier and at least a first neutral current carrier, and the first line current carrier and the first neutral current carrier are configured to provide respective current paths between the first and second electrical current connectors, and to provide current to at least one of the light emitters.

4. The lighting device as recited in claim 1, wherein each of the plurality of light distribution-modifying protrusions has a substantially similar shape.

5. A lighting device as recited in claim 1, wherein at least one of the plurality of light emitters comprises a plurality of light emitting diodes.

6. A lighting device, comprising:

a housing, a plurality of light emitters arranged in a light emitter row, and a light distribution-modifying element, the plurality of light emitters attached to the housing, each of the plurality of light emitters having a respective axis of light emission, the light distribution-modifying element attached to or removably engaged with the housing, the light distribution-modifying element comprising a body portion and a plurality of light distribution-modifying protrusions, each of the light distribution-modifying protrusions extending away from the body portion from a body portion end to a remote end, the light distribution-modifying protrusions arranged in a protrusion row, the protrusion row substantially parallel to the light emitter row, each light distribution-modifying protrusion comprising at least one reflection surface, and at least some of the plurality of light emitters are aligned with at least some of the plurality of light distribution-modifying protrusions as respective pairs, each aligned pair comprising one of the plurality of light emitters and one of the plurality of light distribution-modifying protrusions, arranged and oriented relative to one another such that for each aligned pair, at least some imaginary lines that extend (1) parallel to an axis of light emission of the light emitter, and (2) through a light emission surface of the light emitter, intersect with the light distribution-modifying protrusion, the presence of the light distribution-modifying element causes a greater percentage of light emitted by the plurality of light emitters to travel from a second side of a light distribution imaginary plane to a first side of the light distribution imaginary plane than if the light distribution-modifying element were not present, the light distribution imagery plane (1) encompassing an axis of emission of at least one of the plurality of light emitters and (2) extending through each of the light distribution-modifying protrusions, the first side of the light distribution imaginary plane and the second side of the light distribution imaginary plane on opposite sides of the light distribution imaginary plane.

7. A lighting device, comprising:

a housing, a plurality of light emitters arranged in a light emitter row, and a light distribution-modifying element, the plurality of light emitters attached to the housing, each of the plurality of light emitters having a respective axis of light emission, the light distribution-modifying element attached to or removably engaged with the housing, the light distribution-modifying element comprising a body portion and a plurality of light distribution-modifying protrusions, each of the light distribution-modifying protrusions extending away from the body portion from a body portion end to a remote end, the light distribution-modifying protrusions arranged in a protrusion row, the protrusion row substantially parallel to the light emitter row, each light distribution-modifying protrusion comprising at least one reflection surface, and at least some of the plurality of light emitters are aligned with at least some of the plurality of light distribution-modifying protrusions as respective pairs, each aligned pair comprising one of the plurality of light emitters and one of the plurality of light distribution-modifying protrusions, arranged and oriented relative to one another such that for each aligned pair, at least some imaginary lines that extend (1) parallel to an axis of light emission of the light emitter, and (2) through a light emission surface of the light emitter, intersect with the light distribution-modifying protrusion, for each reflection surface, a greater percentage of an area of the reflection surface is to a second side of a light distribution imaginary plane than to a first side of the light distribution imaginary plane, the light distribution imaginary plane (1) encompassing an axis of emission of at least one of the plurality of light emitters and (2) extending through each of the light distribution-modifying protrusions.

8. A lighting device, comprising:

a housing, a plurality of light emitters arranged in a light emitter row, and a light distribution-modifying element, the plurality of light emitters attached to the housing, each of the plurality of light emitters having a respective axis of light emission, the light distribution-modifying element attached to or removably engaged with the housing, the light distribution-modifying element comprising a body portion and a plurality of light distribution-modifying protrusions, each of the light distribution-modifying protrusions extending away from the body portion from a body portion end to a remote end, the light distribution-modifying protrusions arranged in a protrusion row, the protrusion row substantially parallel to the light emitter row, each light distribution-modifying protrusion comprising at least one reflection surface, and at least some of the plurality of light emitters are aligned with at least some of the plurality of light distribution-modifying protrusions as respective pairs, each aligned pair comprising one of the plurality of light emitters and one of the plurality of light distribution-modifying protrusions, arranged and oriented relative to one another such that for each aligned pair, at least some imaginary lines that extend (1) parallel to an axis of light emission of the light emitter, and (2) through a light emission surface of the light emitter, intersect with the light distribution-modifying protrusion, for each aligned pair comprising one light emitter and one light distribution-modifying protrusion:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

respective total curvatures of the light distribution-modifying protrusion decrease progressively.

9. A lighting device, comprising:

a housing, a plurality of light emitters arranged in a light emitter row, and a light distribution-modifying element, the plurality of light emitters attached to the housing, each of the plurality of light emitters having a respective axis of light emission, the light distribution-modifying element attached to or removably engaged with the housing, the light distribution-modifying element comprising a body portion and a plurality of light distribution-modifying protrusions, each of the light distribution-modifying protrusions extending away from the body portion from a body portion end to a remote end, the light distribution-modifying protrusions arranged in a protrusion row, the protrusion row substantially parallel to the light emitter row, each light distribution-modifying protrusion comprising at least one reflection surface, and at least some of the plurality of light emitters are aligned with at least some of the plurality of light distribution-modifying protrusions as respective pairs, each aligned pair comprising one of the plurality of light emitters and one of the plurality of light distribution-modifying protrusions, arranged and oriented relative to one another such that for each aligned pair, at least some imaginary lines that extend (1) parallel to an axis of light emission of the light emitter, and (2) through a light emission surface of the light emitter, intersect with the light distribution-modifying protrusion, for each aligned pair of one light emitter and one light distribution-modifying protrusion:

in a cross-section in a plane that includes the axis of emission of the light emitter and is perpendicular to a light distribution imaginary plane, the light distribution imaginary plane (1) encompassing an axis of emission of at least one of the plurality of light emitters and (2) extending through each of the light distribution-modifying protrusions:

angles of incidence, relative to the reflection surface of the light distribution-modifying protrusion, of imaginary lines parallel to the axis of emission of the light emitter, are greater at greater distances from the light emitter.

10. A light distribution-modifying element, comprising:

a body portion, and a plurality of light distribution-modifying protrusions arranged in a protrusion row, each of the light distribution-modifying protrusions extending away from the body portion from a body portion end to a remote end, each light distribution-modifying protrusion comprising at least one reflection surface, and the light distribution-modifying protrusions arranged such that each of a series of lines that are parallel to one another and that each extend in a first plane passes through a respective one of the light distribution-modifying protrusions, for each of the plurality of light distribution-modifying protrusions:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

respective total curvatures of the light distribution protrusion decrease progressively.

11. The light distribution-modifying element as recited in claim 10, wherein each of the plurality of light distribution-modifying protrusions has a substantially similar shape.

12. The light distribution-modifying element as recited in claim 10, wherein for each of the plurality of light distribution-modifying protrusions:

in a cross-section of the protrusion in the first of the sequence of planes, the reflection surface has a total curvature in a range of from 200 degrees to 280 degrees;

in a cross-section of the protrusion in the second of the sequence of planes, the reflection surface has a total curvature in a range of from 130 degrees to 210 degrees;

in a cross-section of the protrusion in the third of the sequence of planes, the reflection surface has a total curvature in a range of from 100 degrees to 180 degrees;

in a cross-section of the protrusion in the fourth of the sequence of planes, the reflection surface has a total curvature in a range of from 80 degrees to 160 degrees; and in a cross-section of the protrusion in the fifth of the sequence of planes, the reflection surface has a total curvature in a range of from 0 degrees to 160 degrees.

13. A light distribution-modifying element, comprising:

a body portion, and a plurality of light distribution-modifying protrusions arranged in a protrusion row, each of the light distribution-modifying protrusions extending away from the body portion from a body portion end to a remote end, each light distribution-modifying protrusion comprising at least one reflection surface, and the light distribution-modifying protrusions arranged such that each of a series of lines that are parallel to one another and that each extend in a first plane passes through a respective one of the light distribution-modifying protrusions, for each of the plurality of light distribution-modifying protrusions:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

a length of the reflection surface decreases progressively.

14. A light distribution-modifying element, comprising:

a body portion, and a plurality of light distribution-modifying protrusions arranged in a protrusion row, each of the light distribution-modifying protrusions extending away from the body portion from a body portion end to a remote end, each light distribution-modifying protrusion comprising at least one reflection surface, and the light distribution-modifying protrusions arranged such that each of a series of lines that are parallel to one another and that each extend in a first plane passes through a respective one of the light distribution-modifying protrusions, for each of the plurality of light distribution-modifying protrusions:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

the reflection surface is substantially circular or substantially parabolic in at least one of the sequence of cross-sections.

15. A light distribution-modifying element, comprising:

a body portion, and a plurality of light distribution-modifying protrusions arranged in a protrusion row, each of the light distribution-modifying protrusions extending away from the body portion from a body portion end to a remote end, each light distribution-modifying protrusion comprising at least one reflection surface, and the light distribution-modifying protrusions arranged such that each of a series of lines that are parallel to one another and that each extend in a first plane passes through a respective one of the light distribution-modifying protrusions, each light distribution-modifying protrusion extends away from a first side of the light distribution-modifying element, and for each light distribution-modifying protrusion:

in a cross-section in a plane that includes the line that passes through the light distribution-modifying protrusion and that is perpendicular to the first plane, angles of incidence, relative to the reflection surface of the light distribution-modifying protrusion, of imaginary lines parallel to said line that passes through the light distribution-modifying protrusion, are greater at greater distances from the first side of the light distribution-modifying element.

16. A light distribution-modifying element, comprising:

a body portion, and a plurality of light distribution-modifying protrusions arranged in a protrusion row, each of the light distribution-modifying protrusions extending away from the body portion from a body portion end to a remote end, each light distribution-modifying protrusion comprising at least one reflection surface, and the light distribution-modifying protrusions arranged such that each of a series of lines that are parallel to one another and that each extend in a first plane passes through a respective one of the light distribution-modifying protrusions, for each aligned pair of one light emitter and one light distribution-modifying protrusion:

in a sequence of respective cross-sections of the protrusion in a sequence of first through fifth imaginary planes that are each perpendicular to an axis of emission of the light emitter and that are spaced in increments from the body portion end of the protrusion, each increment equal to 20-30 percent of a distance between the body portion end of the protrusion and the remote end of the protrusion, the first imaginary plane extending through the body portion end of the protrusion, the fifth imaginary plane farthest from the body portion end of the protrusion and comprising the remote end of the protrusion:

the reflector surface is substantially concave.

* * * * *